(12) United States Patent
Pathak

(10) Patent No.: US 11,958,474 B2
(45) Date of Patent: Apr. 16, 2024

(54) PARKING ASSISTANCE WITH SMOOTH HANDOVER, PARKING COMPLETION, OR PARKING CORRECTION

(71) Applicant: Atieva, Inc., Newark, CA (US)

(72) Inventor: Abhishek Pathak, Union City, CA (US)

(73) Assignee: Atieva, Inc., Newark, CA (US)

( * ) Notice: Subject to any disclaimer, the term of this patent is extended or adjusted under 35 U.S.C. 154(b) by 280 days.

(21) Appl. No.: 17/443,067

(22) Filed: Jul. 20, 2021

(65) Prior Publication Data

US 2023/0023349 A1    Jan. 26, 2023

(51) Int. Cl.
| | |
|---|---|
| *B60W 30/06* | (2006.01) |
| *B60W 50/10* | (2012.01) |
| *B60W 50/14* | (2020.01) |
| *G06V 20/58* | (2022.01) |
| *G08G 1/14* | (2006.01) |

(52) U.S. Cl.
CPC ........... *B60W 30/06* (2013.01); *B60W 50/10* (2013.01); *B60W 50/14* (2013.01); *G06V 20/586* (2022.01); *G08G 1/143* (2013.01)

(58) Field of Classification Search
CPC ...... B60W 30/06; B60W 50/10; B60W 50/14; G06V 20/586; G08G 1/143
See application file for complete search history.

(56) References Cited

U.S. PATENT DOCUMENTS

| | | | | |
|---|---|---|---|---|
| 8,489,315 | B2 * | 7/2013 | Yamamoto | B60W 50/0097 |
| | | | | 320/108 |
| 9,599,482 | B2 | 3/2017 | Maise et al. | |
| 9,846,430 | B2 * | 12/2017 | Hiei | B60T 17/22 |
| 9,919,704 | B1 | 3/2018 | Kundu et al. | |
| 9,944,282 | B1 | 4/2018 | Fields et al. | |
| 10,459,442 | B1 | 10/2019 | Hayes et al. | |
| 10,814,865 | B2 | 10/2020 | Seki | |
| 10,821,844 | B2 * | 11/2020 | Roehrl | B60L 53/39 |
| 10,906,531 | B2 * | 2/2021 | Fujita | B60Q 9/002 |
| 10,930,150 | B2 * | 2/2021 | Matsunaga | G08G 1/146 |
| 11,260,851 | B2 * | 3/2022 | Kniep | B60W 30/06 |
| 11,498,553 | B2 * | 11/2022 | Tsujino | B60K 35/00 |

(Continued)

FOREIGN PATENT DOCUMENTS

DE      102017113663 A1 * 12/2018 ......... B62D 15/0285

OTHER PUBLICATIONS

Translation of DE-102017113663-A1, 8 pages (Year: 2018).*

(Continued)

*Primary Examiner* — Dale W Hilgendorf
(74) *Attorney, Agent, or Firm* — Brake Hughes Bellermann LLP

(57) ABSTRACT

A computer-implemented method comprises: continuously monitoring, by an assisted-driving (AD) system using a sensor, surroundings of a vehicle being controlled by a driver; detecting, by the AD system using the sensor, a parking spot that is available; planning, by the AD system and in response to detecting the parking spot, a trajectory for the vehicle to park in the parking spot; and generating a prompt to the driver, by the AD system and in response to detecting the parking spot, to have the AD system handle parking of the vehicle in the parking spot, the prompt performed before the vehicle reaches the parking spot.

19 Claims, 15 Drawing Sheets

(56) References Cited

U.S. PATENT DOCUMENTS

| | | | |
|---|---|---|---|
| 2011/0057813 A1* | 3/2011 | Toledo | B60W 10/20 340/425.5 |
| 2014/0222252 A1* | 8/2014 | Matters | G05D 1/0016 701/2 |
| 2015/0346727 A1 | 12/2015 | Ramanujam | |
| 2016/0068158 A1* | 3/2016 | Elwart | B62D 15/0285 701/1 |
| 2016/0078766 A1* | 3/2016 | Kiyokawa | B62D 15/028 340/932.2 |
| 2017/0144654 A1* | 5/2017 | Sham | G08G 1/148 |
| 2017/0147995 A1 | 5/2017 | Kalimi | |
| 2017/0212511 A1 | 7/2017 | Paiva Ferreira et al. | |
| 2017/0365170 A1 | 12/2017 | Lazic et al. | |
| 2018/0024559 A1* | 1/2018 | Seo | B62D 15/0285 701/23 |
| 2018/0201256 A1* | 7/2018 | Tseng | B62D 15/0285 |
| 2019/0009773 A1* | 1/2019 | Miyahara | B62D 15/0285 |
| 2019/0039604 A1 | 2/2019 | Auracher et al. | |
| 2019/0061774 A1 | 2/2019 | Nordbruch | |
| 2020/0160710 A1* | 5/2020 | Obayashi | G08G 1/143 |
| 2020/0346638 A1 | 11/2020 | Benmimoun et al. | |
| 2020/0409362 A1 | 12/2020 | Long et al. | |
| 2021/0162985 A1* | 6/2021 | Romero Leon | B62D 15/0285 |

OTHER PUBLICATIONS

International Search Report and Written Opinion for PCT Application No. PCT/US2022/073790, dated Jan. 10, 2023, 11 pages.

\* cited by examiner

PARKING ASSISTANCE WITH SMOOTH HANDOVER, PARKING COMPLETION, OR PARKING CORRECTION

TECHNICAL FIELD

This document relates to parking assistance with smooth handover, and/or parking completion, and/or parking correction.

BACKGROUND

Some vehicles manufactured nowadays are equipped with one or more types of systems that can at least in part handle operations relating to the driving of the vehicle. Attempts at providing parking assistance have been made. However, such systems have not provided a smooth handover from the driver to the system. As another example, such systems have not been able to assist the driver with completing a parking maneuver that is underway. As another example, such system have not been able to assist the driver with correcting an already completed parking maneuver.

SUMMARY

In a first aspect, a computer-implemented method comprises: continuously monitoring, by an assisted-driving (AD) system using a sensor, surroundings of a vehicle being controlled by a driver; detecting, by the AD system using the sensor, a parking spot that is available; planning, by the AD system and in response to detecting the parking spot, a trajectory for the vehicle to park in the parking spot; and generating a prompt to the driver, by the AD system and in response to detecting the parking spot, to have the AD system handle parking of the vehicle in the parking spot, the prompt performed before the vehicle reaches the parking spot.

Implementations can include any or all of the following features. The parking spot is substantially parallel to a travel path of the vehicle when the AD system detects the parking spot. The parking spot is substantially perpendicular to a travel path of the vehicle when the AD system detects the parking spot. The parking spot is substantially diagonal to a travel path of the vehicle when the AD system detects the parking spot. The computer-implemented method further comprises: receiving, by the AD system, an input that the driver generates in response to the prompt, the input generated before the vehicle enters the parking spot; and controlling the vehicle, by the AD system and in response to the input, to park the vehicle in the parking spot. The driver exits the vehicle before the AD system parks the vehicle in the parking spot. The driver begins entering the vehicle into the parking spot without accepting the prompt by the AD system, the method further comprising: continuing to generate the prompt to the driver during at least part of a vehicle maneuver where the driver is parking the vehicle in the parking spot. Continuing to generate the prompt indicates that the AD system is available to complete the parking of the vehicle in the parking spot at any time. The computer-implemented method further comprises: receiving, by the AD system, an input that the driver generates in response to the AD system continuing to generate the prompt, the input generated before the vehicle is stationary in the parking spot; and controlling the vehicle, by the AD system and in response to the input, to park the vehicle in the parking spot. The driver finishes parking the vehicle in the parking spot without accepting the prompt by the AD system, the vehicle having a first orientation within the parking spot, the method further comprising: performing motion planning, by the AD system, to move the vehicle into a second orientation within the parking spot; receiving, by the AD system, an input generated by a user to correct the first orientation; and in response to the input, controlling the vehicle, by the AD system and according to the motion planning, to assume the second orientation within the parking spot.

In a second aspect, a computer-implemented method comprises: determining, by an assisted-driving (AD) system using a sensor, that a vehicle controlled by a driver begins entering a parking spot; generating a prompt to the driver, by the AD system and in response to determining that the vehicle begins entering the parking spot, to have the AD system handle parking of the vehicle in the parking spot; receiving, by the AD system, an input generated by the driver in response to the prompt; and controlling the vehicle, by the AD system and in response to the input, to finish parking the vehicle in the parking spot.

Implementations can include any or all of the following features. The prompt includes at least one of a visual message or an audio message. The input is generated using a touchscreen of the vehicle. Generating the prompt indicates that the AD system is available to complete the parking of the vehicle in the parking spot at any time. The driver exits the vehicle before the AD system controls the vehicle to finish parking the vehicle in the parking spot. Controlling the vehicle to finish parking the vehicle in the parking spot comprises parking the vehicle in an orientation within the parking spot, the orientation being obtained using a machine-learning component that has analyzed previous instances where the vehicle was parked.

In a third aspect, a computer-implemented method comprises: determining, by an assisted-driving (AD) system using a sensor, that a vehicle is stationary in a first orientation with regard to a parking spot; performing motion planning, by the AD system, to move the vehicle into a second orientation with regard to the parking spot; generating a prompt to a user, by the AD system and in response to determining that the vehicle is stationary, to have the AD system correct the first orientation; receiving, by the AD system, an input generated by the user in response to the prompt; and in response to the input, controlling the vehicle, by the AD system and according to the motion planning, to assume the second orientation with regard to the parking spot.

Implementations can include any or all of the following features. The user is located outside the vehicle while generating the input. The user is located outside the vehicle while the AD system controls the vehicle to assume the second orientation within the parking spot. The vehicle was initially brought into the first orientation within the parking spot under control of a driver, the method further comprising: determining, by the AD system using the sensor and before determining that the vehicle is stationary, that the vehicle begins entering the parking spot; and generating a prompt to the driver, by the AD system and in response to determining that the vehicle begins entering the parking spot, to have the AD system handle parking of the vehicle in the parking spot; wherein the driver does not accept the prompt before parking the vehicle with the first orientation within the parking spot. The AD system obtains the second orientation using a machine-learning component that has analyzed previous instances where the vehicle was parked.

BRIEF DESCRIPTION OF DRAWINGS

Like reference symbols in the various drawings indicate like elements.

DETAILED DESCRIPTION

Figure 1C:
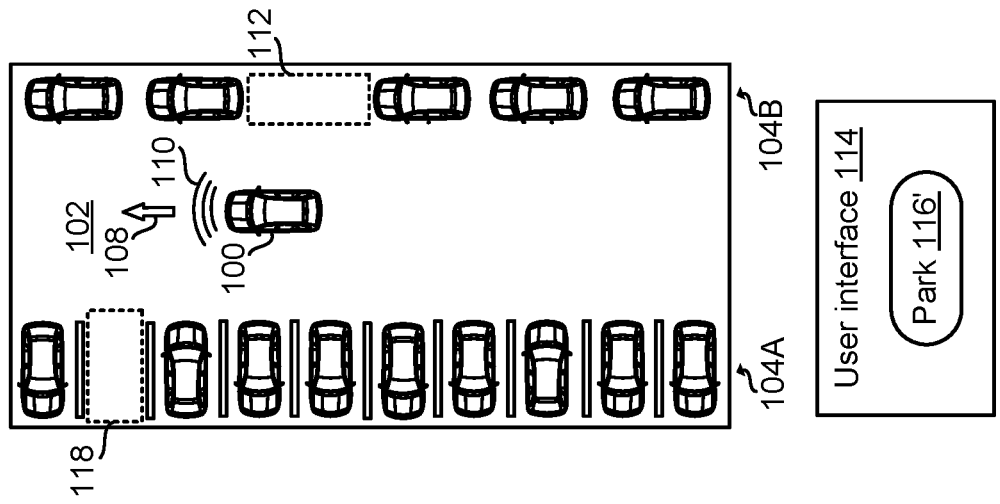
FIGS. 1A-1C show examples of prompting a driver that an assisted-driving (AD) system is available to handle parking of a vehicle.

This document describes examples of systems and techniques for providing parking assistance with smooth handover, and/or parking completion, and/or parking correction. A smooth handover from the driver to the system can be facilitated at least in part by a continuous monitoring by the system for available parking spots, and a continuous performance of motion planning with regard to a nearby detected available parking spot. The system can offer parking completion at each and every moment during the time when the driver is manually performing a parking maneuver. The system can provide parking correction after the driver has manually completed the parking maneuver. Parking completion and/or parking correction can be performed while the driver/passenger is inside the vehicle or outside the vehicle. Parking completion and/or parking correction can be performed based on previously detected manual parking maneuvers so that the vehicle placement is to the person's liking. For example, machine learning can be used.

In some implementations, subject matter described herein can operate in a way that can be characterized as a "parking guardian." A purpose of a parking guardian can be to help the driver park the vehicle by taking control from the driver at any given time, during their effort to manually park the vehicle. The purpose can be to make an automatic parking process even more convenient and fluid by making the controls handover from driver to vehicle possible at any stage of a parking maneuver. A system can be used to correct a parking effort completed by the driver. The parking guardian may always be looking over the driver's shoulder to potentially take control of the vehicle and complete the parking maneuver that the driver initiated. Subject matter described herein can continuously monitor a manual parking effort by the driver. A system can automatically detect that the driver is trying to park the car and can offer complete takeover to complete the rest of the parking automatically. This facilitates that the driver can take advantage of the automatic parking feature at any time, rather than the system manually asking the driver to select the desired parking space at the start of parking effort.

In some implementations, a system is always scanning the environment and evaluating the path planning to take control from the driver at any given point of manual parking effort by driver. In some implementations, a system is flexible and can evaluate and create a trajectory at any given point of parking maneuver by driver, to complete the parking. That is, there may be no designated handover between driver and system. In some implementations, a system can complete part of, or the entire, maneuvering of the vehicle into a selected parking spot. For example, this can involve use of machine-learning techniques. In some implementations, a system can automatically evaluate an immediate space around the vehicle at any given time for a potential parking spot.

Subject matter described herein can provide the ability to always monitor surroundings (e.g., an environment) of a vehicle, and can have the flexibility to take control (e.g., be handed the control by the driver) at each and every point during a manual parking maneuver. Subject matter described herein can provide the ability to detect an available parking spot without having the vehicle be driven past the spot. Subject matter described herein can provide the ability to complete an entire or partial parking maneuver into a particular spot. For example, machine learning can be used. Subject matter described herein can provide the ability to evaluate and create a trajectory for vehicle motion at each and every point of a parking maneuver to complete the parking of the vehicle. For example, no specific handover stage between the driver and the system may be defined. Subject matter described herein can provide the ability to automatically evaluate the immediate space around the vehicle at any given time during a manual parking maneuver for a potential parking spot. Subject matter described herein can provide the ability to let the driver control an automated parking maneuver by a remote device after the driver hands over control to the system. For example, this can take place during or after a manual parking maneuver. Subject matter described herein can provide the ability to use machine learning to automatically park a vehicle in a selected parking spot so that the vehicle has an orientation and/or a position learned from the vehicle's, and/or the driver's, previous parking maneuvers.

Subject matter described herein can provide one or more advantages over prior approaches. An automatic parking feature can be advanced so as to be easier for the driver to use. A feature design can eliminate any pre-defined states for vehicle control handover between the driver and the system. By contrast, in a current auto park assist feature, the driver may need to drive by the spot and then hand over the control to vehicle. Similarly, in at least one existing approach to an auto park assist feature, the driver cannot use the auto park feature if the driver has already initiated the parking effort manually. This proposed invention also continuously monitors the driver's parking effort and is available to take over control from driver like a guardian and complete the rest of the parking at any time. This invention involves techniques including, but not limited to, machine learning, sensor fusion, path planning, trajectory generation, remote activation of parking using mobile app or remote key.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples herein refer to assisted driving. In some implementations, assisted driving can be performed by an assisted-driving (AD) system. For example, an AD system can include an advanced driving-assistance system (ADAS). Assisted driving involves at least partially automating one or more dynamic driving tasks. An ADAS can perform assisted driving and is an example of an assisted-driving system. Assisted driving is performed based in part on the output of one or more sensors typically positioned on, under, or within the vehicle. An AD system can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to a sensor. A sensor is configured to detect an event and/or a change in one or more aspects of its environment and output signal(s) reflecting the detection. As illustrative examples only, a sensor can indicate one or more of a distance between the vehicle and an object, a speed of the vehicle, a trajectory of the vehicle, or an acceleration of the vehicle. A sensor can generate output without probing the surroundings with anything (e.g., like an image sensor that captures electromagnetic radiation), or the sensor can probe the surroundings (e.g., using electromagnetic radiation and/or sound waves) and detect a response to the probing. Examples of sensors that can be used with one or more embodiments include, but are not limited to: a light sensor (e.g., a camera); a scanning system (e.g., lidar); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); an inertial measurement unit; a torque sensor; a temperature sensor (e.g., a primary or secondary thermometer); a pressure sensor (e.g., for ambient air or a component of the vehicle); a humidity sensor (e.g., a rain detector); or a seat occupancy sensor.

Examples herein refer to a parking spot. As used herein, a parking spot includes any location that can be identified as a place to render a vehicle stationary, regardless of the duration of the stay. The parking spot can be, but is not necessarily, defined by one or more markings or structure on the surface on which the vehicle sits. A parking spot can be located on public property or on private property. A parking spot can be located on developed land or on undeveloped land. A parking spot can be located at least partially within a structure or can be located away from any structures. A parking spot can be located inside a building or in open air. A parking spot can be located adjacent a roadway (e.g., street, avenue, or road) or can be located on premises that are set off from at least one roadway. When the parking spot is located adjacent a roadway, the roadway can have one or more lanes. When the parking spot is located adjacent a roadway, the roadway can be restricted to one-way travel (e.g., a one-way street), or can allow two-way traffic. A parking spot can be subject to parking regulations by a government and/or private entity. A parking spot can be subject to monitoring by human personnel and/or automated devices, or the parking spot can be unmonitored. A parking spot can be permanent or temporary. As used herein, a parking lot is a location that includes two or more parking spots.

Examples herein refer to using a sensor to continuously monitor surroundings of a vehicle and detect at least one parking spot that is available. As used herein, to continuously monitor surroundings includes receiving sensor signals indicating that a parking spot is currently not obstructed by anything (e.g., is not occupied by another vehicle). For example, signals from a camera and/or lidar of a vehicle can be used to visually detect a parking spot for the vehicle. When the vehicle is moving, the continuous monitoring can successively evaluate new surroundings as they come within the operating range of the sensor(s). When more than one available parking spot is detected, the system can make all of them available to the driver as potential parking spots, or the system can perform a selection and indicate fewer than all (e.g., one or more) of the detected parking spots to the driver. The system can take into account one or more circumstances in detecting that a parking spot is available. For example, the system can assess whether the vehicle is able to reach the parking spot or whether no navigable path to the parking spot exists. As another example, the system can take into account one or more dimensions of the vehicle, including, but not limited to, length, width, height, and/or ground clearance. As another example, the system can take into account one or more parking regulations that may be applicable. For example, if a space that would otherwise accommodate the vehicle is labelled "no parking" (by signage at the location or by information otherwise accessible to the system in electronic records), the system may not indicate that parking spot as being available.

Examples herein refer to generation of a prompt. As used herein, a prompt can be generated in any way that is noticeable and comprehensible to the driver. In some implementations, a prompt can be generated by presenting one or more visual messages on a display device. For example, the display device can be provided with a touchscreen function to allow the driver to make one or more types of input using the device. In some implementations, a prompt can be generated by playing one or more audio messages on a speaker. In some implementations, a prompt can be generated by triggering one or more forms of haptic output and/or tactile output to the driver.

Examples herein refer to a driver or a passenger generating an input in response to a prompt from the system. As used herein an input can be generated using any form of technology available in the vehicle. In some implementations, the input can be generated by activating a touchscreen. In some implementations, the input can be implemented by actuating a switch (e.g., by pressing a button, and/or activating a turn signal). In some implementations, the input can be detected by audio (e.g., by a microphone that detects an audible utterance interpreted as a voice command).

Examples herein refer to machine-learning. As used herein, using machine learning can include employing artificial intelligence where a machine such as an assisted-driving system has capability of perceiving its environment and taking actions to achieve one or more goals. A machine-learning algorithm can apply one or more principles of data mining to derive a driving envelope from data collected regarding a vehicle and its related circumstances. A machine-learning algorithm can be trained in one or more regards. For example, supervised, semi-supervised, and/or unsupervised training can be performed. In some implementations, a machine-learning algorithm can make use of one or more classifiers. For example, a classifier can assign one or more labels to instances recognized in processed data. In some implementations, a machine-learning algorithm can make use of one or more forms of regression analysis. For example, a machine-learning algorithm can apply regression to determine one or more numerical values. In some implementations, a machine-learning algorithm can be configured to collect and store data, detect events using the data, identify the context(s) using the data, and generate a driving envelope based at least in part on a detected event and the context(s).

Figure 1B:
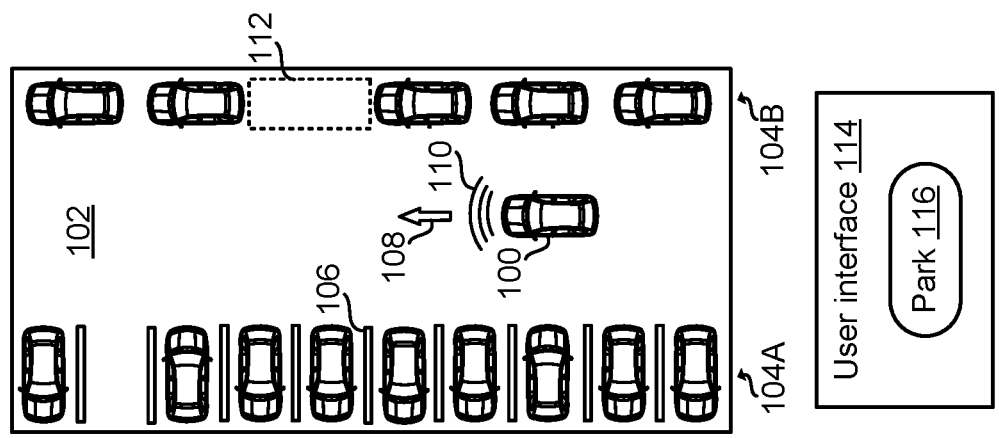
Figure 1A:
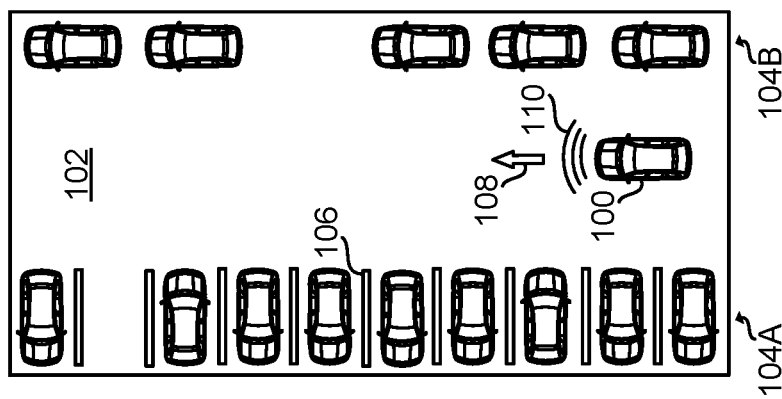

FIGS. 1A-1C show examples of prompting a driver that an assisted-driving (AD) system is available to handle parking of a vehicle 100. Some or all of the examples relating to the vehicle 100 can be used together with one or more other examples described elsewhere herein.

The examples will be described with reference to a parking lot 102, which can have one or more entrances or exits (not shown) for vehicles. Parking spots in the parking lot 102 can be arranged in one or more rows. A row 104A includes parking spots defined by dividers 106 (e.g., painted or structural) so that vehicles are positioned essentially in perpendicular to the direction of travel along the row 104A. One or more rows in the parking lot 102 may have parking spots that are not separated from each other by any dividers. Here, a row 104B includes parking spots where vehicles are positioned essentially in parallel to the direction of travel along the row 104B. Other approaches can be used.

The vehicle 100 is traveling within the parking lot 102, as schematically indicated by an arrow 108. The vehicle 100 is traveling in a lane that is formed between the rows 104A-104B. The vehicle 100 is currently being controlled essentially by the driver. For example, the driver is currently maneuvering the vehicle 100 using a steering wheel, gear selector, accelerator, and brake pedal, in search of an available parking spot in the parking lot 102.

The AD system of the vehicle 100 is continuously monitoring the surroundings of the vehicle 100 using at least one sensor to detect whether any parking spots are available. The use of the sensor is here schematically illustrated by way of a signal 110 near the vehicle 100, although the sensor does not necessarily generate any radiation or other emission to probe the surroundings. In the example shown in FIG. 1A, the vehicle 100 has not yet detected any available parking spot in the parking lot 102.

FIG. 1B shows an example where the vehicle 100 has continued to travel within the parking lot 102 from the example described above. The continuous monitoring of the surroundings of the vehicle 100 has here resulted in detection of a parking spot 112. The parking spot 112 is located in the row 104B. The parking spot 112 is here detected before the vehicle 100 has arrived at the parking spot 112. For example, it is not necessary for the vehicle 100 to drive up alongside the parking spot 112, or begin entering the parking spot 112, for the detection to occur. Rather, the system detects the parking spot 112 when the sensor(s) generate a signal that reliably indicates that the parking spot 112 is suitable for the vehicle 100 and is not currently occupied.

As mentioned above, at this point in the example the vehicle 100 may be controlled solely by the driver. Nevertheless, the AD system can plan a trajectory for the vehicle 100 with regard to every parking spot that the AD system detects. This can ensure that the AD system can provide a fluid handover from the driver at any time if the driver so chooses. Here, for example, the AD system plans a trajectory for the vehicle 100 to enter the parking spot 112 in case the driver wishes to have the vehicle 100 parked there.

The AD system can generate a prompt to the driver regarding one or more detected parking spots. Here, a user interface (UI) 114 of the vehicle 100 is schematically illustrated. The UI 114 is an example of a human-machine interface (HMI) that the vehicle 100 can use for communication to and from the driver or another passenger. In some implementations, the UI 114 can include a graphical UI (GUI). For example, the GUI can be generated using a display device having touchscreen functionality. Here, the UI 114 makes a control 116 available to the driver. For example, the control 116 can be a GUI button labeled "Park" that offers the driver to have the AD system handle parking of the vehicle 100 in the parking spot 112. In some implementations, the UI 114 can indicate the parking spot 112 in which the AD system is currently offering to park the vehicle 100 for the driver. For example, the UI 114 can present a map of at least part of the parking lot 102 with the parking spot 112 indicated; or the UI 114 can indicate the parking spot 112 by way of augmented reality (AR) technology applied to an image captured of the surroundings of the vehicle 100. Other approaches can be used.

The driver can accept the prompt by actuating the control 116. The control 116 can be made available to the driver before the vehicle 100 has arrived at the parking spot 112. For example, it is not necessary for the vehicle 100 to drive up alongside the parking spot 112, or begin entering the parking spot 112, for the control 116 to be active. If the driver accepts the prompt by actuating the control 116, the AD system can take over some or all control of the vehicle 100 and maneuver the vehicle 100 into the parking spot 112. This can involve the AD system receiving the input that the driver generates using the control 116 in response to the prompt, such input being generated before the vehicle enters the parking spot 112. The AD system can then control the vehicle, in response to the input, to park the vehicle in the parking spot 112. For example, the AD system can perform this maneuvering using the trajectory for the vehicle 100 that the AD system generates upon detecting the parking spot 112. This functionality can ensure that convenient parking assistance is provided to the driver, both for identifying available parking spots and, if the driver so wishes at any time during the operation, for taking over to maneuver the vehicle 100 into an available parking spot. The driver can actuate the control 116 using a GUI of the vehicle 100, a GUI of a portable electronic device, by giving an audio command (e.g., using audio interface 1132 in FIG. 11, or a portable electronic device), and/or by making a gesture (e.g., using the visual interface 1134 in FIG. 11, or a portable electronic device), to name just a few examples.

In cases where there is a handover to the AD system, the driver can exit the vehicle 100 before or after control is given to the AD system, or can remain in the vehicle 100 during the maneuver. For example, after the control 116 is made available, the driver can stop the vehicle 100, exit the vehicle into the parking lot 102, and actuate the control 116 using a remote-control device (e.g., a portable electronic device such as a smartphone having an app that presents the control 116 for actuation). As another example, after stopping the vehicle 100, the driver can open a door of the vehicle 100 and can then actuate the control 116 using a GUI inside the vehicle 100. The AD system can receive the input that the driver generates, and can wait with executing the parking maneuver until it is detected that the door of the vehicle 100 has been closed (at which time the driver may have exited the vehicle 100.) Other approaches can be used.

Here, the driver does not accept the prompt that the AD system generates. For example, the driver may prefer to park somewhere else within the parking lot 102, such as a place nearer to where the driver is heading, and/or a parking spot that does not involve parallel parking. The driver therefore does not actuate the control 116 regarding the parking spot 112 but rather continues driving the vehicle 100 in the parking lot 102.

FIG. 1C shows an example where the vehicle 100 has continued to travel within the parking lot 102 from the examples described above. The continuous monitoring of the surroundings of the vehicle 100 has here resulted in detection of a parking spot 118. The parking spot 118 is located in the row 104A. The parking spot 118 is here detected before the vehicle 100 has arrived at the parking spot 118. For example, it is not necessary for the vehicle 100 to drive up alongside the parking spot 118, or begin entering the parking spot 118, for the detection to occur. Rather, the system detects the parking spot 118 when the sensor(s) generate a signal that reliably indicates that the parking spot 118 is suitable for the vehicle 100 and is not currently occupied.

As mentioned above, at this point in the example the vehicle 100 may be controlled solely by the driver. Nevertheless, the AD system can plan a trajectory for the vehicle 100 with regard to every parking spot that the AD system detects. This can ensure that the AD system can provide a fluid handover from the driver at any time if the driver so chooses. Here, for example, the AD system plans a trajectory for the vehicle 100 to enter the parking spot 118 in case the driver wishes to have the vehicle 100 parked there.

The AD system can generate a prompt to the driver regarding one or more detected parking spots. Here, the UI 114 of the vehicle 100 is schematically illustrated. Here, the UI 114 makes a control 116' available to the driver. For example, the control 116' can be a GUI button labeled "Park" that offers the driver to have the AD system handle parking of the vehicle 100 in the parking spot 118. In some implementations, the UI 114 can indicate the parking spot 118 in which the AD system is currently offering to park the vehicle 100 for the driver. For example, the UI 114 can present a map of at least part of the parking lot 102 with the parking spot 118 indicated; or the UI 114 can indicate the parking spot 118 by way of AR technology applied to an image captured of the surroundings of the vehicle 100. Other approaches can be used.

The driver can accept the prompt by actuating the control 116'. The control 116' can be made available to the driver before the vehicle 100 has arrived at the parking spot 118. For example, it is not necessary for the vehicle 100 to drive up alongside the parking spot 118, or begin entering the parking spot 118, for the control 116' to be active. If the driver accepts the prompt by actuating the control 116', the AD system can take over some or all control of the vehicle 100 and maneuver the vehicle 100 into the parking spot 118. This can involve the AD system receiving the input that the driver generates using the control 116' in response to the prompt, such input being generated before the vehicle enters the parking spot 118. The AD system can then control the vehicle, in response to the input, to park the vehicle in the parking spot 118. For example, the AD system can perform this maneuvering using the trajectory for the vehicle 100 that the AD system generates upon detecting the parking spot 118. This functionality can ensure that convenient parking assistance is provided to the driver, both for identifying available parking spots and, if the driver so wishes at any time during the operation, for taking over to maneuver the vehicle 100 into an available parking spot. The driver can actuate the control 116' using a GUI of the vehicle 100, a GUI of a portable electronic device, by giving an audio command (e.g., using audio interface 1132 in FIG. 11, or a portable electronic device), and/or by making a gesture (e.g., using the visual interface 1134 in FIG. 11, or a portable electronic device), to name just a few examples.

In cases where there is a handover to the AD system, the driver can exit the vehicle 100 before or after control is given to the AD system, or can remain in the vehicle 100 during the maneuver. For example, after the control 116' is made available, the driver can stop the vehicle 100, exit the vehicle into the parking lot 102, and actuate the control 116' using a remote-control device (e.g., a portable electronic device such as a smartphone having an app that presents the control 116' for actuation). As another example, after stopping the vehicle 100, the driver can open a door of the vehicle 100 and can then actuate the control 116' using a GUI inside the vehicle 100. The AD system can receive the input that the driver generates, and can wait with executing the parking maneuver until it is detected that the door of the vehicle 100 has been closed (at which time the driver may have exited the vehicle 100.) Other approaches can be used.

Figure 2:
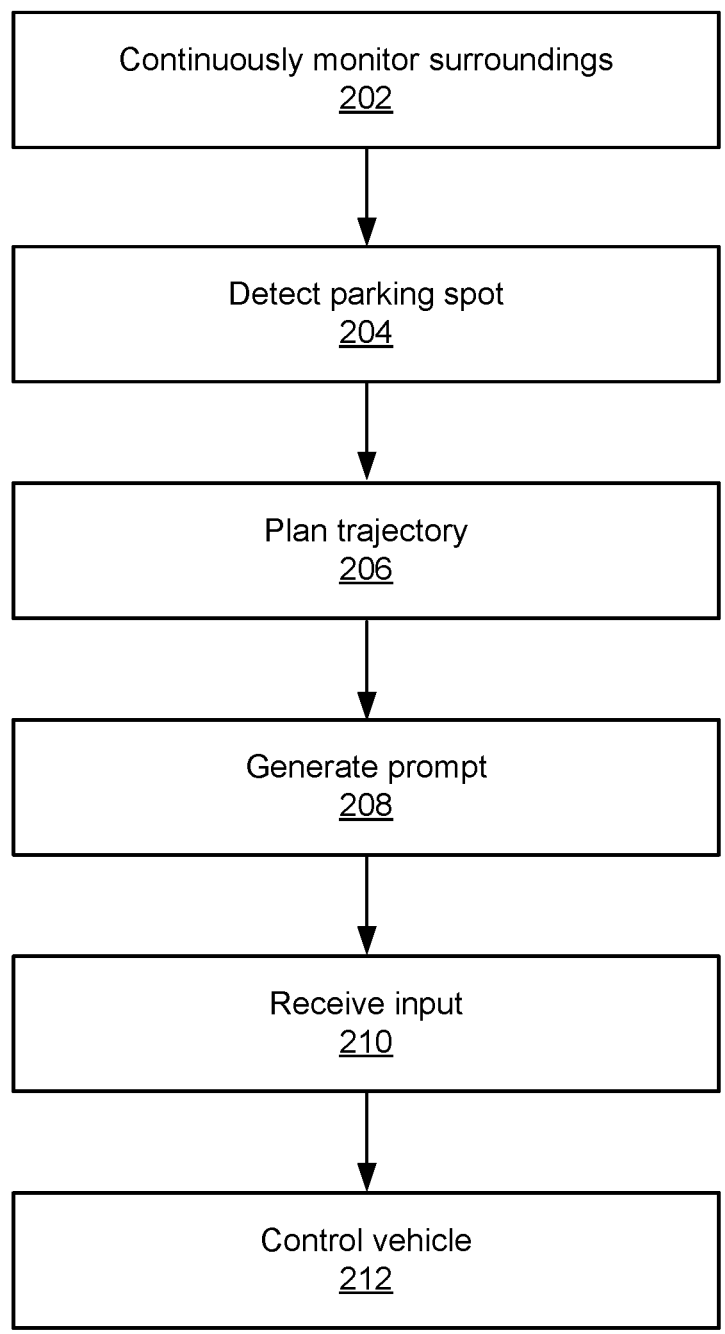
FIG. 2 shows a flowchart of a method relating to the examples in FIGS. 1A-1C.

FIG. 2 shows a flowchart of a method 200 relating to the examples in FIGS. 1A-1C. The method 200 can be used with one or more other examples described elsewhere herein. More or fewer operations than shown can be performed. Two or more operations can be performed in a different order unless otherwise indicated.

At operation 202, continuous monitoring of surroundings of a vehicle using a sensor can be performed by an AD system. The vehicle may currently be controlled by a driver. With reference again briefly to FIGS. 1A-1C for example, some or all of the parking lot 102 can be continuously monitored by the AD system of the vehicle 100.

At operation 204, the AD system can detect a parking spot that is available. In FIGS. 1A-1C, for example, the parking spot 112 and/or 118 can be detected.

At operation 206, the AD system can plan a trajectory for the vehicle to park in the parking spot. For example, such trajectory can be defined as a path to be travelled by the vehicle as a result of sequential control by the AD system of the vehicle's steering system, transmission, accelerator pedal, and/or brake pedal.

At operation 208, the AD system can generate a prompt to the driver to have the AD system handle parking of the vehicle in the parking spot. The prompt can be generated in response to detecting the parking spot and can be generated before the vehicle reaches the parking spot. In FIGS. 1A-1C, for example, the AD system can provide the control 116 and/or 116' to the driver.

At operation 210, the AD system can receive an input that the driver generates in response to the prompt. The input can be generated before the vehicle enters the parking spot. In FIGS. 1A-1C, for example, the driver can actuate the control 116 and/or 116'.

At operation 212, the AD system in response to the input received at operation 210 can control the vehicle to park the vehicle in the parking spot. In FIGS. 1A-1C, for example, the AD system can, after being handed control by the driver, perform the maneuvering to park the vehicle 100 in the parking spot 112 or 118.

FIGS. 3A-3D show examples of prompting a driver that an AD system is available to complete an ongoing parking maneuver of a vehicle 300. Some or all of the examples relating to the vehicle 300 can be used together with one or more other examples described elsewhere herein.

The examples will be described with reference to a parking lot 302, which can have one or more entrances or exits (not shown) for vehicles. Parking spots in the parking lot 302 can be arranged in one or more rows. One or more rows in the parking lot 302 may have parking spots that are separated from each other by dividers (e.g., painted or structural). One or more rows in the parking lot 302 may have parking spots that are not separated from each other by any dividers. Here, a row 304 includes parking spots where vehicles are positioned essentially in parallel to the direction of travel along the row 304. Other approaches can be used.

The AD system of the vehicle 300 is continuously monitoring the surroundings of the vehicle 300 using at least one sensor to detect whether any parking spots are available. The use of the sensor is here schematically illustrated by way of a signal 306 near the vehicle 300, although the sensor does not necessarily generate any radiation or other emission to probe the surroundings. In the example shown in FIG. 3A, the vehicle 300 has detected a parking spot 308 in the parking lot 302. The parking spot 308 may have been detected before the vehicle 300 has arrived at the parking spot 308. For example, it is not necessary for the vehicle 300 to drive up alongside the parking spot 308, or begin entering the parking spot 308, for the detection to occur. Rather, the system detects the parking spot 308 when the sensor(s) generate a signal that reliably indicates that the parking spot 308 is suitable for the vehicle 300 and is not currently occupied.

The AD system can plan a trajectory for the vehicle 300 with regard to every parking spot that the AD system detects. This can ensure that the AD system can provide a fluid handover from the driver at any time if the driver so chooses. Here, for example, the AD system plans a trajectory for the vehicle 300 to enter the parking spot 308 in case the driver wishes to have the vehicle 300 parked there.

The vehicle 300 is currently being controlled essentially by the driver. For example, the driver is currently maneuvering the vehicle 300 using a steering wheel, gear selector, accelerator, and brake pedal. The vehicle 300 is traveling into the parking spot 308, as schematically indicated by an arrow 310. The driver is currently maneuvering the vehicle 300 in a way that indicates to the AD system that the driver is intending to park in the parking spot 308. For example, the driver has begun entering the parking spot 308 with the vehicle 300.

The AD system can generate a prompt to the driver regarding one or more detected parking spots. Here, a UI 312 of the vehicle 300 is schematically illustrated. The UI 312 is an example of an HMI that the vehicle 300 can use for communication to and from the driver or another passenger. In some implementations, the UI 312 can include a GUI. For example, the GUI can be generated using a display device having touchscreen functionality. Here, the UI 312 makes a control 314 available to the driver. For example, the control 314 can be a GUI button labeled "Complete my parking" that offers the driver to have the AD system complete the parking of the vehicle 300 in the parking spot 308. In some implementations, the control 314 may be provided in conjunction with ceasing to provide the control 116 or 116' (FIGS. 1B-1C). For example, a seamless transition can be provided between the AD system offering to help in case the driver wishes the vehicle 300 to be parked, to the AD system instead offering to complete the ongoing parking maneuver that the driver initiated. In some implementations, the UI 312 can indicate the parking spot 308 in which the AD system is currently offering to complete parking of the vehicle 300 for the driver. For example, the UI 312 can present a map of at least part of the parking lot 302 with the parking spot 308 indicated; or the UI 312 can indicate the parking spot 308 by way of AR technology applied to an image captured of the surroundings of the vehicle 300. Other approaches can be used.

The AD system can continue to generate the prompt during some or all of the time that the driver is maneuvering the vehicle 300 into the parking spot 308. For example, continuing to generate the prompt indicates that the AD system is available to take over and complete the parking of the vehicle in the parking spot 308 at any time. That is, no specific handover point may be designated, and instead the driver has the opportunity to request the AD system's assistance at any time before manually completing the parking maneuver. Examples described below will illustrate that assistance by the AD system may be available also after the driver has manually parked the vehicle 300.

That is, the control 314 can be made available to the driver in response to the AD system determining that the driver begins entering the parking spot 308. The driver can accept the prompt by actuating the control 314. If the driver accepts the prompt, the AD system can take over some or all control of the vehicle 300 and complete the maneuvering of the vehicle 300 into the parking spot 308. This can involve the AD system receiving the input that the driver generates using the control 314 in response to the prompt. The AD system can then control the vehicle, in response to the input, to complete the parking of the vehicle 300 in the parking spot 308. For example, the AD system can perform this maneuvering using the trajectory for the vehicle 300 that the AD system generates upon detecting the parking spot 308. This functionality can ensure that convenient parking assistance is provided to the driver, if the driver so wishes at any time during the parking operation, for taking over to complete the maneuvering of the vehicle 300 into the parking spot 308. The driver can actuate the control 314 using a GUI of the vehicle 300, a GUI of a portable electronic device, by giving an audio command (e.g., using audio interface 1132 in FIG. 11, or a portable electronic device), and/or by making a gesture (e.g., using the visual interface 1134 in FIG. 11, or a portable electronic device), to name just a few examples.

In cases where there is a handover to the AD system, the driver can exit the vehicle 300 before or after control is given to the AD system, or can remain in the vehicle during the maneuver. For example, after the control 314 is made available, the driver can stop the vehicle 300, exit the vehicle into the parking lot 302, and actuate the control 314 using a remote-control device (e.g., a portable electronic device such as a smartphone having an app that presents the control 314 for actuation). As another example, after stopping the vehicle 300, the driver can open a door of the vehicle 300 and can then actuate the control 314 using a GUI inside the vehicle 300. The AD system can receive the input that the driver generates, and can wait with completing the execution of the parking maneuver until it is detected that the door of the vehicle 300 has been closed (at which time the driver may have exited the vehicle 300.) Other approaches can be used.

Figure 3B:
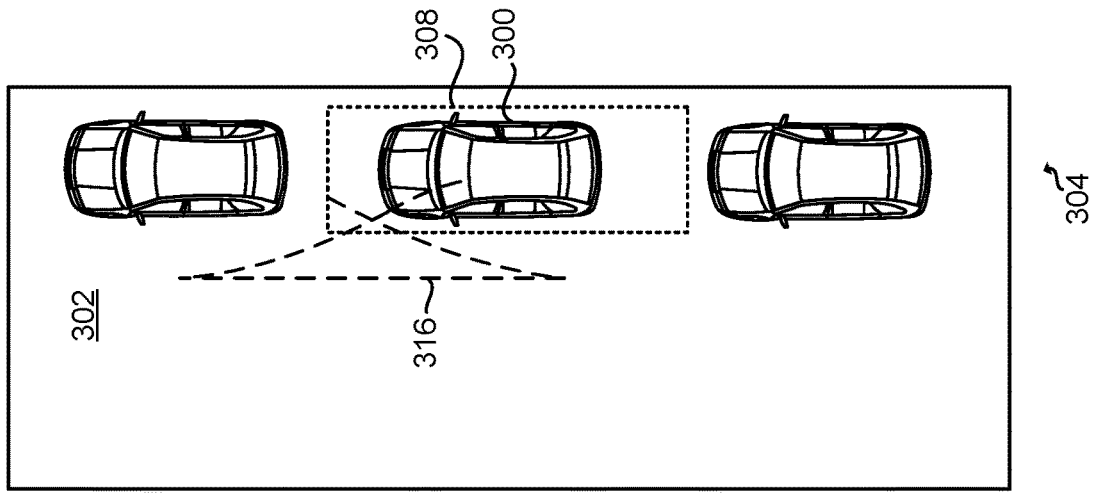
FIGS. 3A-3D show examples of prompting a driver that an AD system is available to complete an ongoing parking maneuver of a vehicle.

Here, the driver accepts the prompt that the AD system generates by actuating the control 314. FIG. 3B shows the parking lot 302 after the AD system has finished its execution of the completion of the parking maneuver. A path 316 schematically illustrates that the AD system's performance can include one or more operations by the vehicle 300 to follow a planned trajectory. For example, if the AD system is asked to take over control when the vehicle 300 is currently oriented nose-first into the parking spot 308, the path 316 can involve first driving the vehicle 300 in reverse, then driving the vehicle 300 forward, and finally again driving the vehicle 300 in reverse to enter the parking spot 308. Other approaches can be used.

The planned trajectory according to which the AD system controls the vehicle 300 to follow the path 316 can be defined based on the current position and orientation of the vehicle 300 at the moment of planning, as well as one or more characteristics regarding the travel during the parking maneuver and/or the intended resulting position and orientation of the vehicle 300. For example, the trajectory can be planned so that the orientation of the vehicle 300 within the parking spot 308, once the parking is completed, matches the orientation of one or more other vehicles (e.g., the nearest vehicle(s)) in the row 304. As another example, the trajectory can be planned so that the position of the vehicle 300 within the parking spot 308, once the parking is completed, has at least a particular amount of space in front of and/or behind the vehicle 300 (e.g., substantially an equal amount of space in front of as behind the vehicle 300). As another example, the trajectory can be planned so that the position of the vehicle 300 within the parking spot 308, once the parking is completed, has at least a particular amount of space to the left of and/or to the right of the vehicle 300 (e.g., substantially an equal amount of space to the right and left of the vehicle 300). As another example, the trajectory can be planned so that the position of the vehicle 300 within the parking spot 308, once the parking is completed, has at most a predefined distance from a curb that is adjacent the parking spot 308. In some implementations, machine-learning technology can be used. For example, the AD system can plan the trajectory so that the vehicle 300 once stationary will have a position and/or orientation matching previously performed parking placements of the vehicle 300 and/or that are otherwise associated with the driver.

Figure 3A:
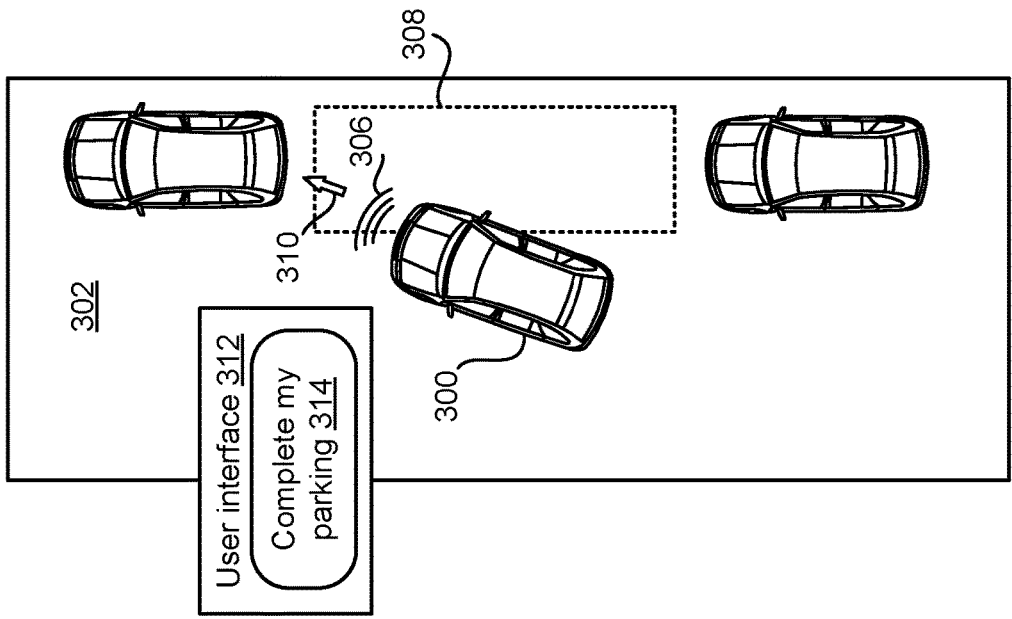
Figure 3C:
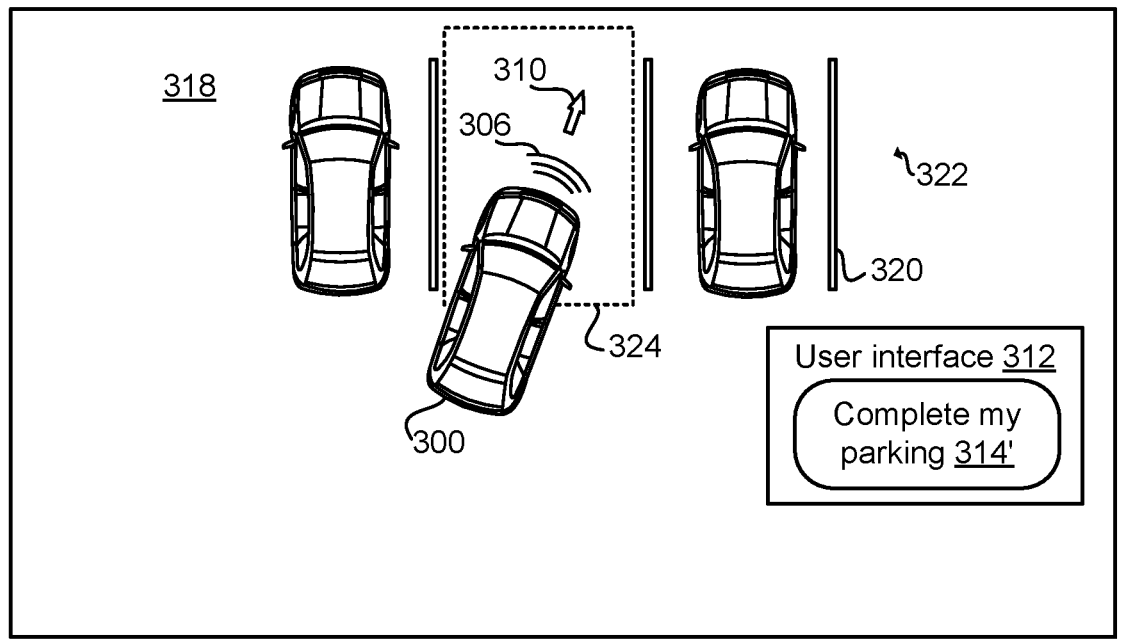
Figure 3D:
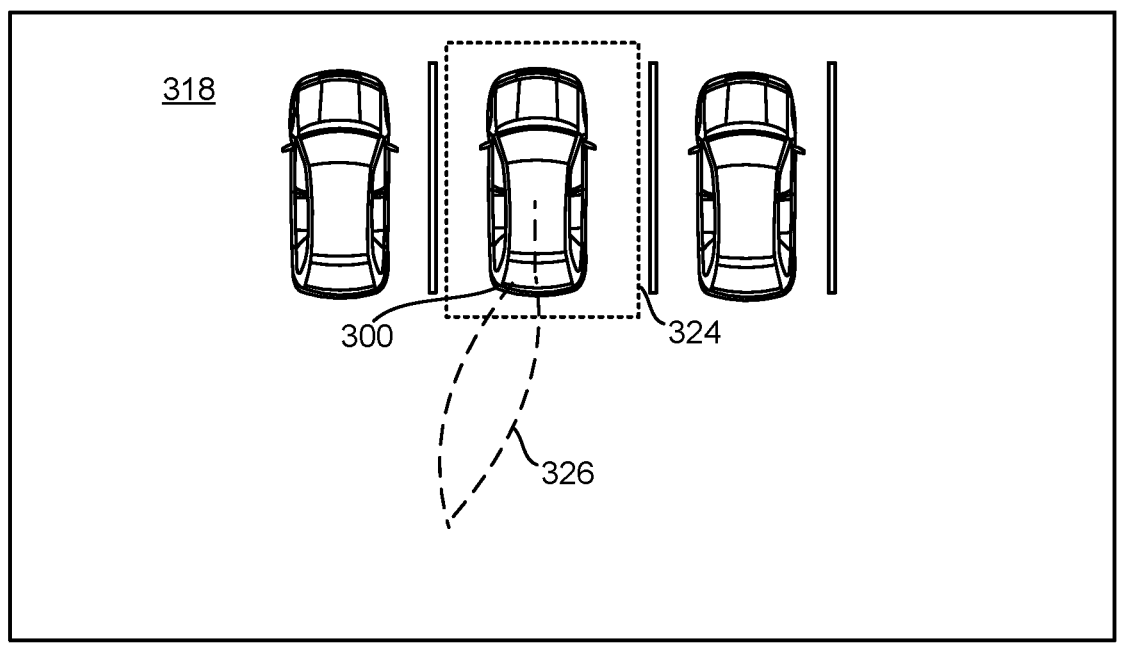

Turning now to FIGS. 3C-3D, examples will be described with reference to a parking lot 318, which can have one or more entrances or exits (not shown) for vehicles. Parking spots in the parking lot 318 can be arranged in one or more rows. One or more rows in the parking lot 318 may have parking spots that are separated from each other by dividers 320 (e.g., painted or structural). One or more rows in the parking lot 318 may have parking spots that are not separated from each other by any dividers. Here, a row 322 includes parking spots where vehicles are positioned essentially in perpendicular to the direction of travel along the row 322. Other approaches can be used.

The AD system of the vehicle 300 is continuously monitoring the surroundings of the vehicle 300 using at least one sensor to detect whether any parking spots are available. The use of the sensor is here schematically illustrated by way of the signal 306 near the vehicle 300, although the sensor does not necessarily generate any radiation or other emission to probe the surroundings. In the example shown in FIG. 3C, the vehicle 300 has detected a parking spot 324 in the parking lot 318. The parking spot 324 may have been detected before the vehicle 300 has arrived at the parking spot 324. For example, it is not necessary for the vehicle 300 to drive up to the parking spot 324, or begin entering the parking spot 324, for the detection to occur. Rather, the system detects the parking spot 324 when the sensor(s) generate a signal that reliably indicates that the parking spot 324 is suitable for the vehicle 300 and is not currently occupied.

The AD system can plan a trajectory for the vehicle 300 with regard to every parking spot that the AD system detects. This can ensure that the AD system can provide a fluid handover from the driver at any time if the driver so chooses. Here, for example, the AD system plans a trajectory for the vehicle 300 to enter the parking spot 324 in case the driver wishes to have the vehicle 300 parked there.

The vehicle 300 is currently being controlled essentially by the driver. For example, the driver is currently maneuvering the vehicle 300 using a steering wheel, gear selector, accelerator, and brake pedal. The vehicle 300 is traveling into the parking spot 324, as schematically indicated by an arrow 310. The driver is currently maneuvering the vehicle 300 in a way that indicates to the AD system that the driver is intending to park in the parking spot 324. For example, the driver has begun entering the parking spot 324 with the vehicle 300.

The AD system can generate a prompt to the driver regarding one or more detected parking spots. Here, the UI 312 of the vehicle 300 is schematically illustrated. Here, the UI 312 makes a control 314' available to the driver. For example, the control 314' can be a GUI button labeled "Complete my parking" that offers the driver to have the AD system complete the parking of the vehicle 300 in the parking spot 324. In some implementations, the control 314' may be provided in conjunction with ceasing to provide the control 116 or 116' (FIGS. 1B-1C). For example, a seamless transition can be provided between the AD system offering to help in case the driver wishes the vehicle 300 to be parked, to the AD system instead offering to complete the ongoing parking maneuver that the driver initiated. In some implementations, the UI 312 can indicate the parking spot 324 in which the AD system is currently offering to complete parking of the vehicle 300 for the driver. For example, the UI 312 can present a map of at least part of the parking lot 318 with the parking spot 324 indicated; or the UI 312 can indicate the parking spot 324 by way of AR technology applied to an image captured of the surroundings of the vehicle 300. Other approaches can be used.

The AD system can continue to generate the prompt during some or all of the time that the driver is maneuvering the vehicle 300 into the parking spot 324. For example, continuing to generate the prompt indicates that the AD system is available to take over and complete the parking of the vehicle in the parking spot 324 at any time. That is, no specific handover point may be designated, and instead the driver has the opportunity to request the AD system's assistance at any time before manually completing the parking maneuver. Examples described below will illustrate that assistance by the AD system may be available also after the driver has manually parked the vehicle 300.

That is, the control 314' can be made available to the driver in response to the AD system determining that the driver begins entering the parking spot 324. The driver can accept the prompt by actuating the control 314'. If the driver accepts the prompt, the AD system can take over some or all control of the vehicle 300 and complete the maneuvering of the vehicle 300 into the parking spot 324. This can involve the AD system receiving the input that the driver generates using the control 314' in response to the prompt. The AD system can then control the vehicle, in response to the input, to complete the parking of the vehicle 300 in the parking spot 324. For example, the AD system can perform this maneuvering using the trajectory for the vehicle 300 that the AD system generates upon detecting the parking spot 324. This functionality can ensure that convenient parking assistance is provided to the driver, if the driver so wishes at any time during the parking operation, for taking over to complete the maneuvering of the vehicle 300 into the parking spot 324. The driver can actuate the control 314' using a GUI of the vehicle 300, a GUI of a portable electronic device, by giving an audio command (e.g., using audio interface 1132 in FIG. 11, or a portable electronic device), and/or by making a gesture (e.g., using the visual interface 1134 in FIG. 11, or a portable electronic device), to name just a few examples.

In cases where there is a handover to the AD system, the driver can exit the vehicle 300 before or after control is given to the AD system, or can remain in the vehicle during the maneuver. For example, after the control 314' is made available, the driver can stop the vehicle 300, exit the vehicle into the parking lot 318, and actuate the control 314' using a remote-control device (e.g., a portable electronic device such as a smartphone having an app that presents the control 314' for actuation). As another example, after stopping the vehicle 300, the driver can open a door of the vehicle 300 and can then actuate the control 314' using a GUI inside the vehicle 300. The AD system can receive the input that the driver generates, and can wait with completing the execution of the parking maneuver until it is detected that the door of the vehicle 300 has been closed (at which time the driver may have exited the vehicle 300.) Other approaches can be used.

Here, the driver accepts the prompt that the AD system generates by actuating the control 314'. FIG. 3D shows the parking lot 318 after the AD system has finished its execution of the completion of the parking maneuver. A path 326 schematically illustrates that the AD system's performance can include one or more operations by the vehicle 300 to follow a planned trajectory. For example, if the AD system is asked to take over control when the vehicle 300 is currently oriented nose-first into the parking spot 324, the path 316 can involve first driving the vehicle 300 in reverse, then driving the vehicle 300 forward to enter the parking spot 324. Other approaches can be used.

The planned trajectory according to which the AD system controls the vehicle 300 to follow the path 326 can be defined based on the current position and orientation of the vehicle 300 at the moment of planning, as well as one or more characteristics regarding the travel during the parking maneuver and/or the intended resulting position and orientation of the vehicle 300. For example, the trajectory can be planned so that the orientation of the vehicle 300 within the parking spot 324, once the parking is completed, matches the orientation of one or more other vehicles (e.g., the nearest vehicle(s)) in the row 322. As another example, the trajectory can be planned so that the position of the vehicle 300 within the parking spot 324, once the parking is completed, has at least a particular amount of space in front of and/or behind the vehicle 300 (e.g., substantially an equal amount of space in front of as behind the vehicle 300). As another example, the trajectory can be planned so that the position of the vehicle 300 within the parking spot 324, once the parking is completed, has at least a particular amount of space to the left of and/or to the right of the vehicle 300 (e.g., substantially an equal amount of space to the right and left of the vehicle 300). As another example, the trajectory can be planned so that the position of the vehicle 300 within the parking spot 324, once the parking is completed, has at most a predefined distance from a curb that is adjacent the parking spot 324. In some implementations, machine-learning technology can be used. For example, the AD system can plan the trajectory so that the vehicle 300 once stationary will have a position and/or orientation matching previously performed parking placements of the vehicle 300 and/or that are otherwise associated with the driver.

Figure 4:
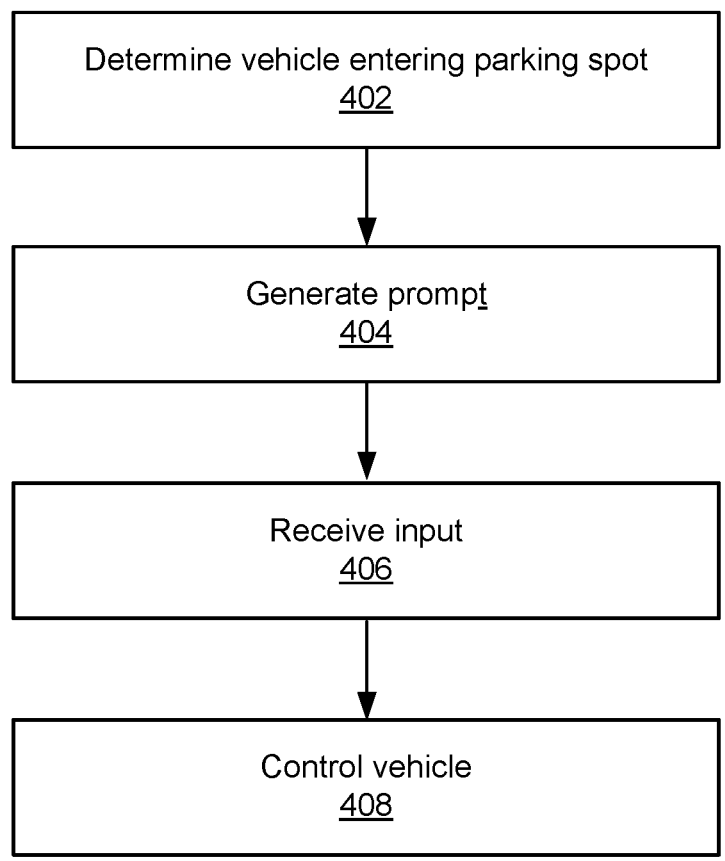
FIG. 4 shows a flowchart of a method relating to the examples in FIGS. 3A-3B and/or 3C-3D.

FIG. 4 shows a flowchart of a method 400 relating to the examples in FIGS. 3A-3B and/or 3C-3D. The method 400 can be used with one or more other examples described elsewhere herein. More or fewer operations than shown can be performed. Two or more operations can be performed in a different order unless otherwise indicated.

At operation 402, an AD system can determine using a sensor that a vehicle controlled by a driver begins entering a parking spot. With reference again briefly to FIGS. 3A-3D for example, it can be determined that the vehicle 300 begins entering the parking spot 308 and/or 324.

At operation 404, the AD system can generate a prompt to the driver to have the AD system handle parking of the vehicle in the parking spot. The prompt can be generated in response to determining that the vehicle begins entering the parking spot. In FIGS. 3A-3D, for example, the AD system can provide the control 314 and/or 314' to the driver.

At operation 406, the AD system can receive an input that the driver generates in response to the prompt. In FIGS. 3A-3D, for example, the driver can actuate the control 314 and/or 314'.

At operation 408, the AD system in response to the input received at operation 406 can control the vehicle to park the vehicle in the parking spot. In FIGS. 3A-3D, for example, the AD system can, after being handed control by the driver, perform the maneuvering to complete the parking of the vehicle 300 in the parking spot 308 or 324.

FIGS. 5A-5D show examples of using an AD system to correct a completed parking of a vehicle 500. Some or all of the examples relating to the vehicle 500 can be used together with one or more other examples described elsewhere herein.

The examples will be described with reference to a parking lot 502, which can have one or more entrances or exits (not shown) for vehicles. Parking spots in the parking lot 502 can be arranged in one or more rows. One or more rows in the parking lot 502 may have parking spots that are separated from each other by dividers (e.g., painted or structural). One or more rows in the parking lot 502 may have parking spots that are not separated from each other by any dividers. Here, a row 504 includes parking spots where vehicles are positioned essentially in parallel to the direction of travel along the row 504. Other approaches can be used.

The vehicle 500 has been parked approximately within a parking spot 506 that is located in the row 504. In this example, the vehicle 500 was parked by a driver and not by an AD system. In some implementations, the driver maneuvered the vehicle 500 using a steering wheel, gear selector, accelerator, and brake pedal. For example, with reference again briefly to the examples in FIGS. 3A-3B, the driver of that vehicle may have not accepted the prompt from the AD system (i.e., not actuated the control 314) and instead manually parked the vehicle. The vehicle 500 here has an orientation that may not be considered ideal or even acceptable for parking in the parking lot 502. For example, the orientation of the vehicle 500 is characterized in that the orientation does not match the orientation of other vehicles in the row 504; the space in front of and behind the vehicle 500 is uneven and/or may be insufficient; the space to the left and right of the vehicle 500 is uneven and/or may be insufficient; and/or the vehicle 500 may be too far from the curb.

The AD system of the vehicle 500 can determine that the vehicle 500 is stationary within the parking lot 502. Moreover, the AD system can determine using the sensor that the vehicle 500 has a first orientation with regard to the parking spot 506. The use of the sensor is here schematically illustrated by way of signals 508 near the vehicle 500, although the sensor does not necessarily generate any radiation or other emission to probe the surroundings.

The AD system can perform motion planning to move the vehicle 500 into a second orientation with regard to the parking spot 506. For example, performing the motion planning can include planning a trajectory from the first orientation to the second orientation. Here, for example, the AD system can perform the motion planning for the vehicle 500 in case the driver wishes to have the AD system correct the parking of the vehicle 500.

The AD system can generate a prompt to the driver to have the AD system correct the first orientation of the vehicle. Here, a UI 510 of the vehicle 500 is schematically illustrated. The UI 510 is an example of an HMI that the vehicle 500 can use for communication to and from the driver or another passenger. In some implementations, the UI 510 can include a GUI. For example, the GUI can be generated using a display device having touchscreen functionality. Here, the UI 510 makes a control 512 available to the driver. For example, the control 512 can be a GUI button labeled "Fix my parking" that offers the driver to have the AD system correct the parking of the vehicle 500 in the parking spot 506. In some implementations, the control 512 may be provided in conjunction with ceasing to provide the control 314 (FIG. 3A). For example, a seamless transition can be provided between the AD system offering to help complete the ongoing parking of the vehicle 500, to the AD system instead offering to correct the finished parking maneuver of the driver. In some implementations, the UI 510 can indicate the second orientation to which the AD system is currently offering to correct the parking of the vehicle 500. For example, the UI 510 can present a map of the parking spot 506 with the second orientation indicated; or the UI 510 can indicate the second orientation by way of AR technology applied to an image captured of the parking spot 506. Other approaches can be used.

That is, the control 512 can be made available to the driver in response to the AD system determining that the vehicle 500 is stationary in the first orientation. The driver can accept the prompt by actuating the control 512. If the driver accepts the prompt, the AD system can take over some or all control of the vehicle 500 and correct the parking of the vehicle 500 with regard to the parking spot 506. This can involve the AD system receiving the input that the driver generates using the control 512 in response to the prompt. The AD system can then control the vehicle, in response to the input, to complete the parking of the vehicle 500 in the parking spot 506. For example, the AD system can perform this maneuvering using the motion planning regarding the second orientation for the vehicle 500 that the AD system generates. This functionality can ensure that convenient parking assistance is provided to the driver, if the driver so wishes after a completed manual parking operation. The driver can actuate the control 512 using a GUI of the vehicle 500, a GUI of a portable electronic device, by giving an audio command (e.g., using audio interface 1132 in FIG. 11, or a portable electronic device), and/or by making a gesture (e.g., using the visual interface 1134 in FIG. 11, or a portable electronic device), to name just a few examples.

In cases where there is a handover to the AD system, the driver can exit the vehicle 500 before or after control is given to the AD system, or can remain in the vehicle during the maneuver. For example, the driver can exit the vehicle 500 into the parking lot 502, and actuate the control 512 using a remote-control device (e.g., a portable electronic device such as a smartphone having an app that presents the control 512 for actuation). As another example, after stopping the vehicle 500, the driver can open a door of the vehicle 500 and can then actuate the control 512 using a GUI inside the vehicle 500. The AD system can receive the input that the driver generates, and can wait with completing the correction of the parking until it is detected that the door of the vehicle 500 has been closed (at which time the driver may have exited the vehicle 500.) Other approaches can be used.

Figure 5B:
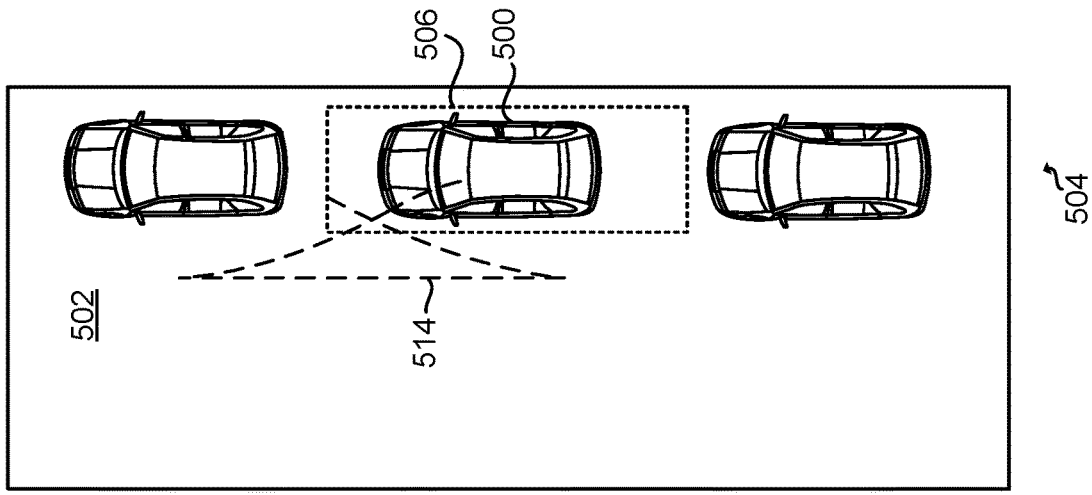
FIGS. 5A-5D show examples of using an AD system to correct a completed parking of a vehicle.

Here, the driver accepts the prompt that the AD system generates by actuating the control 512. FIG. 5B shows the parking lot 502 after the AD system has finished its execution of the completion of the parking maneuver. A path 514 schematically illustrates that the AD system's performance can include one or more operations by the vehicle 500 to follow a planned trajectory. For example, if the AD system is asked to correct the parking when the vehicle 500 is currently stationary in a nose-first orientation into the parking spot 506, the path 514 can involve first driving the vehicle 500 in reverse, then driving the vehicle 500 forward, and finally again driving the vehicle 500 in reverse to enter the parking spot 506. Other approaches can be used.

The motion planning according to which the AD system controls the vehicle 500 to follow the path 514 can be defined based on the first orientation of the vehicle 500 at the moment of planning, as well as the intended second orientation of the vehicle 500. The second orientation can be defined according to one or more characteristics. For example, the second orientation can match the orientation of one or more other vehicles (e.g., the nearest vehicle(s)) in the row 504. As another example, the second orientation can position the vehicle 500 to have at least a particular amount of space in front of and/or behind the vehicle 500 (e.g., substantially an equal amount of space in front of as behind the vehicle 500). As another example, the second orientation can position the vehicle 500 to have at least a particular amount of space to the left of and/or to the right of the vehicle 500 (e.g., substantially an equal amount of space to the right and left of the vehicle 500). As another example, the second orientation can position the vehicle 500 to have at most a predefined distance from a curb that is adjacent the parking spot 506. In some implementations, machine-learning technology can be used. For example, the AD system can perform the motion planning so that the second orientation will match previously performed parking placements of the vehicle 500 and/or that are otherwise associated with the driver.

Figure 5A:
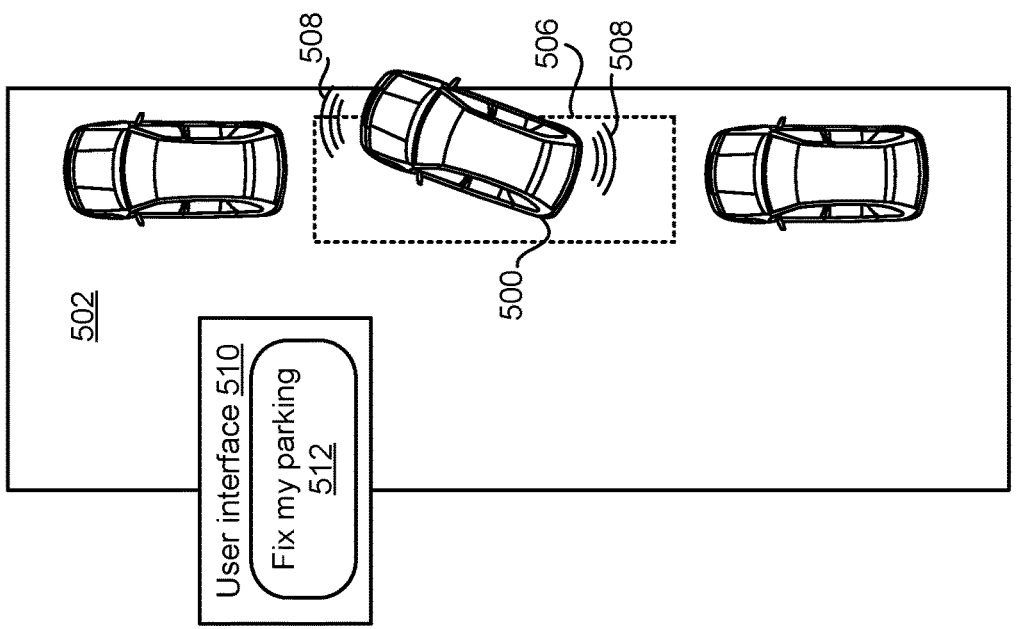
Figure 5C:
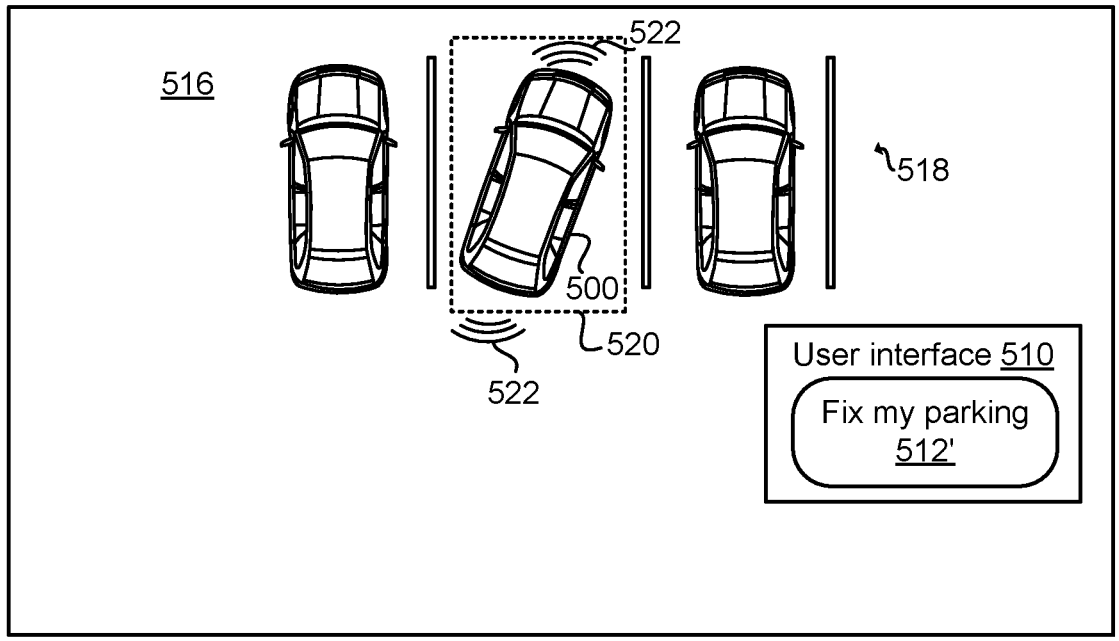
Figure 5D:
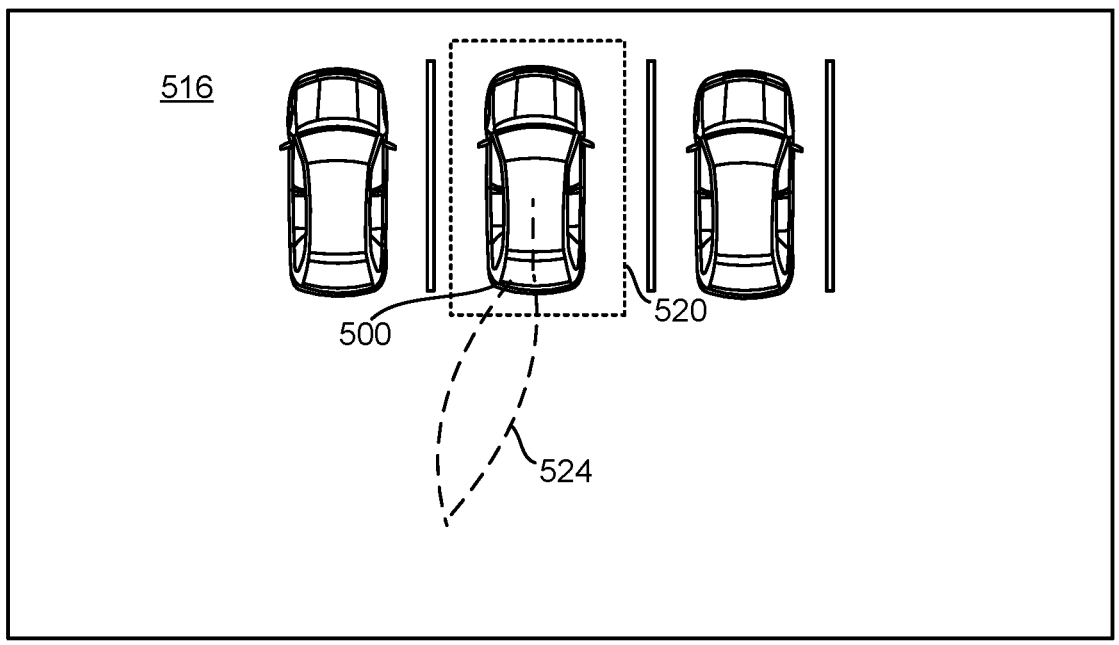

Turning now to FIGS. 5C-5D, examples will be described with reference to a parking lot 516, which can have one or more entrances or exits (not shown) for vehicles. Parking spots in the parking lot 516 can be arranged in one or more rows. One or more rows in the parking lot 516 may have parking spots that are separated from each other by dividers (e.g., painted or structural). One or more rows in the parking lot 516 may have parking spots that are not separated from each other by any dividers. Here, a row 518 includes parking spots where vehicles are positioned essentially in perpendicular to the direction of travel along the row 518. Other approaches can be used.

The vehicle 500 has been parked approximately within a parking spot 520 that is located in the row 518. In this example, the vehicle 500 was parked by a driver and not by an AD system. In some implementations, the driver maneuvered the vehicle 500 using a steering wheel, gear selector, accelerator, and brake pedal. For example, with reference again briefly to the examples in FIGS. 3C-3D, the driver of that vehicle may have not accepted the prompt from the AD system (i.e., not actuated the control 314') and instead manually parked the vehicle. The vehicle 500 here has an orientation that may not be considered ideal or even acceptable for parking in the parking lot 516. For example, the orientation of the vehicle 500 is characterized in that the orientation does not match the orientation of other vehicles in the row 518; the space in front of and behind the vehicle 500 is uneven and/or may be insufficient; the space to the left and right of the vehicle 500 is uneven and/or may be insufficient; and/or the vehicle 500 may be too far from the curb.

The AD system of the vehicle 500 can determine that the vehicle 500 is stationary within the parking lot 516. Moreover, the AD system can determine using the sensor that the vehicle 500 has a first orientation with regard to the parking spot 520. The use of the sensor is here schematically illustrated by way of signals 522 near the vehicle 500, although the sensor does not necessarily generate any radiation or other emission to probe the surroundings.

The AD system can perform motion planning to move the vehicle 500 into a second orientation with regard to the parking spot 520. For example, performing the motion planning can include planning a trajectory from the first orientation to the second orientation. Here, for example, the AD system can perform the motion planning for the vehicle 500 in case the driver wishes to have the AD system correct the parking of the vehicle 500.

The AD system can generate a prompt to the driver to have the AD system correct the first orientation of the vehicle. Here, the UI 510 of the vehicle 500 is schematically illustrated. Here, the UI 510 makes a control 512' available to the driver. For example, the control 512' can be a GUI button labeled "Fix my parking" that offers the driver to have the AD system correct the parking of the vehicle 500 in the parking spot 520. In some implementations, the control 512' may be provided in conjunction with ceasing to provide the control 314' (FIG. 3C). For example, a seamless transition can be provided between the AD system offering to help complete the ongoing parking of the vehicle 500, to the AD system instead offering to correct the finished parking maneuver of the driver. In some implementations, the UI 510 can indicate the second orientation to which the AD system is currently offering to correct the parking of the vehicle 500. For example, the UI 510 can present a map of the parking spot 520 with the second orientation indicated; or the UI 510 can indicate the second orientation by way of AR technology applied to an image captured of the parking spot 520. Other approaches can be used.

That is, the control 512' can be made available to the driver in response to the AD system determining that the vehicle 500 is stationary in the first orientation. The driver can accept the prompt by actuating the control 512'. If the driver accepts the prompt, the AD system can take over some or all control of the vehicle 500 and correct the parking of the vehicle 500 with regard to the parking spot 520. This can involve the AD system receiving the input that the driver generates using the control 512' in response to the prompt. The AD system can then control the vehicle, in response to the input, to complete the parking of the vehicle 500 in the parking spot 520. For example, the AD system can perform this maneuvering using the motion planning regarding the second orientation for the vehicle 500 that the AD system generates. This functionality can ensure that convenient parking assistance is provided to the driver, if the driver so wishes after a completed manual parking operation. The driver can actuate the control 512' using a GUI of the vehicle 500, a GUI of a portable electronic device, by giving an audio command (e.g., using audio interface 1132 in FIG. 11, or a portable electronic device), and/or by making a gesture (e.g., using the visual interface 1134 in FIG. 11, or a portable electronic device), to name just a few examples.

In cases where there is a handover to the AD system, the driver can exit the vehicle 500 before or after control is given to the AD system, or can remain in the vehicle during the maneuver. For example, the driver can exit the vehicle 500 into the parking lot 516, and actuate the control 512' using a remote-control device (e.g., a portable electronic device such as a smartphone having an app that presents the control 512' for actuation). As another example, after stopping the vehicle 500, the driver can open a door of the vehicle 500 and can then actuate the control 512' using a GUI inside the vehicle 500. The AD system can receive the input that the driver generates, and can wait with completing the correction of the parking until it is detected that the door of the vehicle 500 has been closed (at which time the driver may have exited the vehicle 500.) Other approaches can be used.

Here, the driver accepts the prompt that the AD system generates by actuating the control 512'. FIG. 5D shows the parking lot 516 after the AD system has finished its execution of the completion of the parking maneuver. A path 524 schematically illustrates that the AD system's performance can include one or more operations by the vehicle 500 to follow a planned trajectory. For example, if the AD system is asked to correct the parking when the vehicle 500 is currently stationary in a nose-first orientation into the parking spot 520, the path 524 can involve first driving the vehicle 500 in reverse, and then driving the vehicle 500 forward to enter the parking spot 520. Other approaches can be used.

The motion planning according to which the AD system controls the vehicle 500 to follow the path 524 can be defined based on the first orientation of the vehicle 500 at the moment of planning, as well as the intended second orientation of the vehicle 500. The second orientation can be defined according to one or more characteristics. For example, the second orientation can match the orientation of one or more other vehicles (e.g., the nearest vehicle(s)) in the row 518. As another example, the second orientation can position the vehicle 500 to have at least a particular amount of space in front of and/or behind the vehicle 500 (e.g., substantially an equal amount of space in front of as behind the vehicle 500). As another example, the second orientation can position the vehicle 500 to have at least a particular amount of space to the left of and/or to the right of the vehicle 500 (e.g., substantially an equal amount of space to the right and left of the vehicle 500). As another example, the second orientation can position the vehicle 500 to have at most a predefined distance from a curb that is adjacent the parking spot 520. In some implementations, machine-learning technology can be used. For example, the AD system can perform the motion planning so that the second orientation will match previously performed parking placements of the vehicle 500 and/or that are otherwise associated with the driver.

Figure 6:
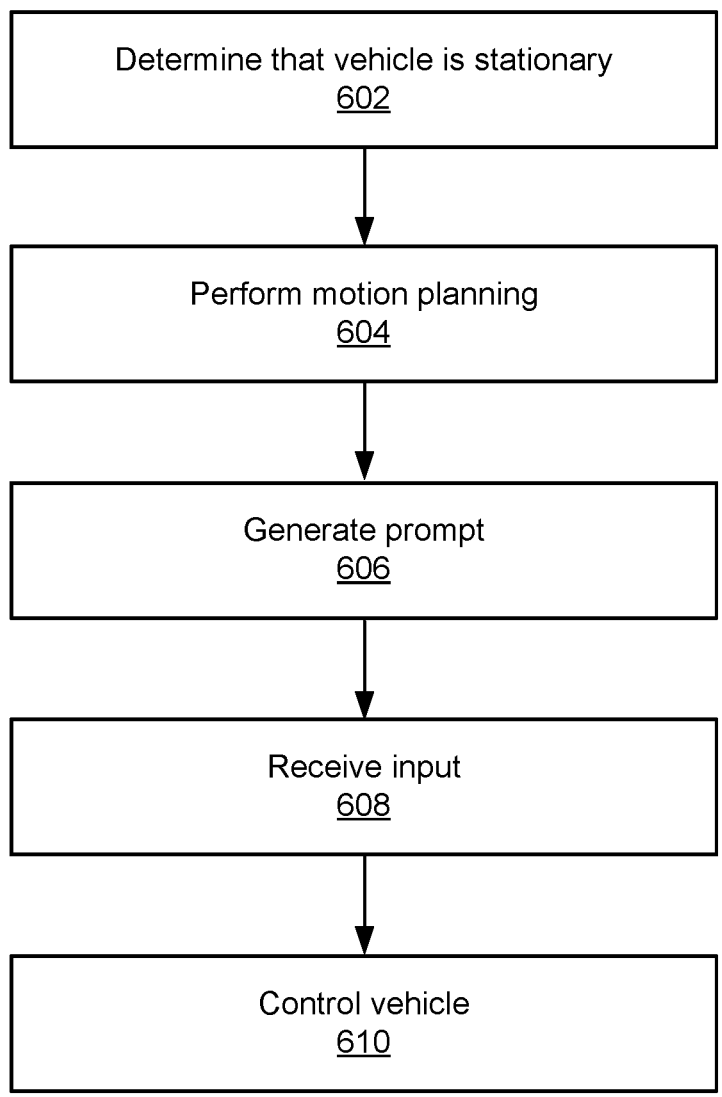
FIG. 6 shows a flowchart of a method relating to the examples in FIGS. 5A-5B and/or 5C-5D.

FIG. 6 shows a flowchart of a method 600 relating to the examples in FIGS. 5A-5D. The method 600 can be used with one or more other examples described elsewhere herein. More or fewer operations than shown can be performed. Two or more operations can be performed in a different order unless otherwise indicated.

At operation 602, an AD system can determine that a vehicle is stationary in a first orientation with regard to a parking spot. With reference again briefly to FIGS. 5A-5D for example, the AD system can determine that the vehicle 500 is stationary approximately within the parking spot 506 or 520.

At operation 604, the AD system can perform motion planning to move the vehicle into a second orientation with regard to the parking spot. In some implementations, this can involve the AD system planning a trajectory for the vehicle to park with regard to the parking spot. For example, such trajectory can be defined as a path to be travelled by the vehicle as a result of sequential control by the AD system of the vehicle's steering system, transmission, accelerator pedal, and/or brake pedal.

At operation 606, the AD system can generate a prompt to the driver to have the AD system correct the first orientation of the vehicle. The prompt can be generated in response to detecting that the vehicle is stationary. In FIGS. 5A-5D, for example, the AD system can provide the control 512 and/or 512' to the driver.

At operation 608, the AD system can receive an input that the driver generates in response to the prompt. In FIGS. 5A-5D, for example, the driver can actuate the control 512 and/or 512'.

At operation 610, the AD system in response to the input received at operation 608 can control the vehicle to assume the second orientation with regard to the parking spot. The control can be performed according to the motion planning. In FIGS. 5A-5D, for example, the AD system can, after being handed control by the driver, perform the maneuvering to correct the parking by controlling the motion of the vehicle 100 according to the path 514 or 524.

Figure 7:
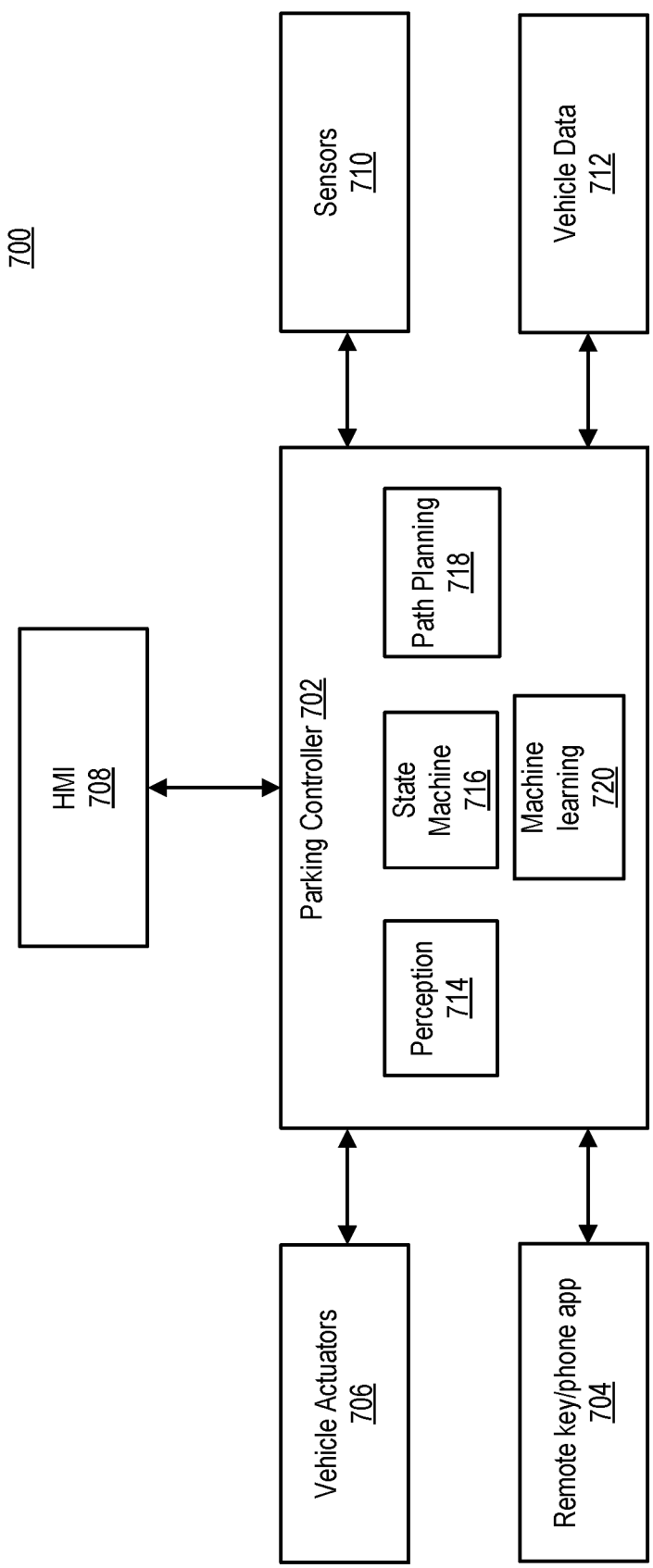
FIG. 7 shows an example of a system.

FIG. 7 shows an example of a system 700. The system 700 can be used with one or more other examples described elsewhere herein. For example, the system 700 can be implemented as part of any or all vehicles described herein. The system 700 can be implemented in multiple units that are separate components from each other, or as a single integrated component, to name just two examples. The component(s) of the system 700 can include one or more of the components mentioned below with reference to FIG. 13.

The system 700 includes a parking controller 702 that is connected to each of multiple respective components. Such components here include a remote key/phone app 704, vehicle actuators 706, an HMI 708, sensors 710, and a vehicle data component 712.

The parking controller 702 can include one or more subcomponents. Here, the parking controller 702 includes a perception component 714, a state machine 716, a path planning component 718, and a machine learning component 720.

The perception component 714 can receive, coordinate, analyze, interpret, and/or act on perception input regarding the vehicle. In some implementations, the perception input can be obtained at least in part from the sensors 710. For example, the sensors 710 can indicate the surroundings of a vehicle, how the vehicle is traveling, the location of the vehicle, and/or the orientation of the vehicle.

The state machine 716 can define different operational states for the vehicle and thereby can directly or indirectly regulate the operation of other components of the system 700 and/or the vehicle. In some implementations, the state machine can define one or more levels of operation where assistance is provided by an AD system. For example, such assistance can include searching for a parking spot, completing an ongoing manual parking maneuver, or fixing a manually completed parking of a vehicle.

The path planning component 718 can be used for motion planning, such as by planning one or more trajectories that the AD system will use for controlling the vehicle if a handover occurs. For example, the path planning component can define sequences of operations that affect the steering angle adjustment, gear selection, acceleration, and/or braking of the vehicle in order to navigate along the defined path.

The machine learning component 720 can receive input regarding the driving behavior of the vehicle and/or the driver, analyze the data of the input, and use the analysis to control future automatic control of the vehicle. In some implementations, the machine learning component 720 obtains signals and/or other information from the vehicle actuators 706, the sensors 710, or the vehicle data component 712. For example, the machine learning component 720 can determine how the vehicle has typically been parked in the past, and/or how the driver of the vehicle has typically parked another vehicle in the past.

The remote key/phone app 704 can be used for remotely controlling the vehicle either directly or indirectly. In some implementations, the remote key/phone app 704 can be used for generating the prompt and receiving the input corresponding to actuation of the controls 116 or 116' (FIGS. 1B-C), the controls 314 or 314' (FIGS. 3A, 3C), and/or the controls 512 or 512' (FIGS. 5A, 5C). For example, the remote key/phone app 704 can allow the driver to trigger completion of a parking maneuver, and/or correction of a completed parking, while being outside the vehicle.

The vehicle actuators 706 serve to control aspects of the vehicle's operation. For example, steering, gear selection, acceleration, and/or braking can be controlled.

The HMI 708 can facilitate communication between the vehicle (e.g., the AD system) and the driver before, during, and after the vehicle is being driven. In some implementations, the HMI 708 can be used for generating the prompt and receiving the input corresponding to actuation of the controls 116 or 116' (FIGS. 1B-C), the controls 314 or 314'

(FIGS. 3A, 3C), and/or the controls 512 or 512' (FIGS. 5A, 5C). For example, a touchscreen device can be used.

The sensors 710 detect or otherwise register characteristics of the vehicle's surroundings. For example, the sensors 710 can be used for determining whether there are parking spots available near the vehicle, whether the vehicle is entering a parking spot, whether the vehicle has become stationary approximately within a parking spot, and/or the vehicle's position and orientation relative to its surroundings.

The vehicle data component 712 can indicate characteristics of the vehicle (e.g., its size or what type of terrain it is designed to navigate), the nature of the current driving session (e.g., whether a navigation destination has been defined), and/or external information (e.g., global positioning system data, traffic data, and/or weather data). Any or all types of information from the vehicle data component 712 can be used by the parking controller in performing operations according to one or more of the examples described herein.

Figure 8:
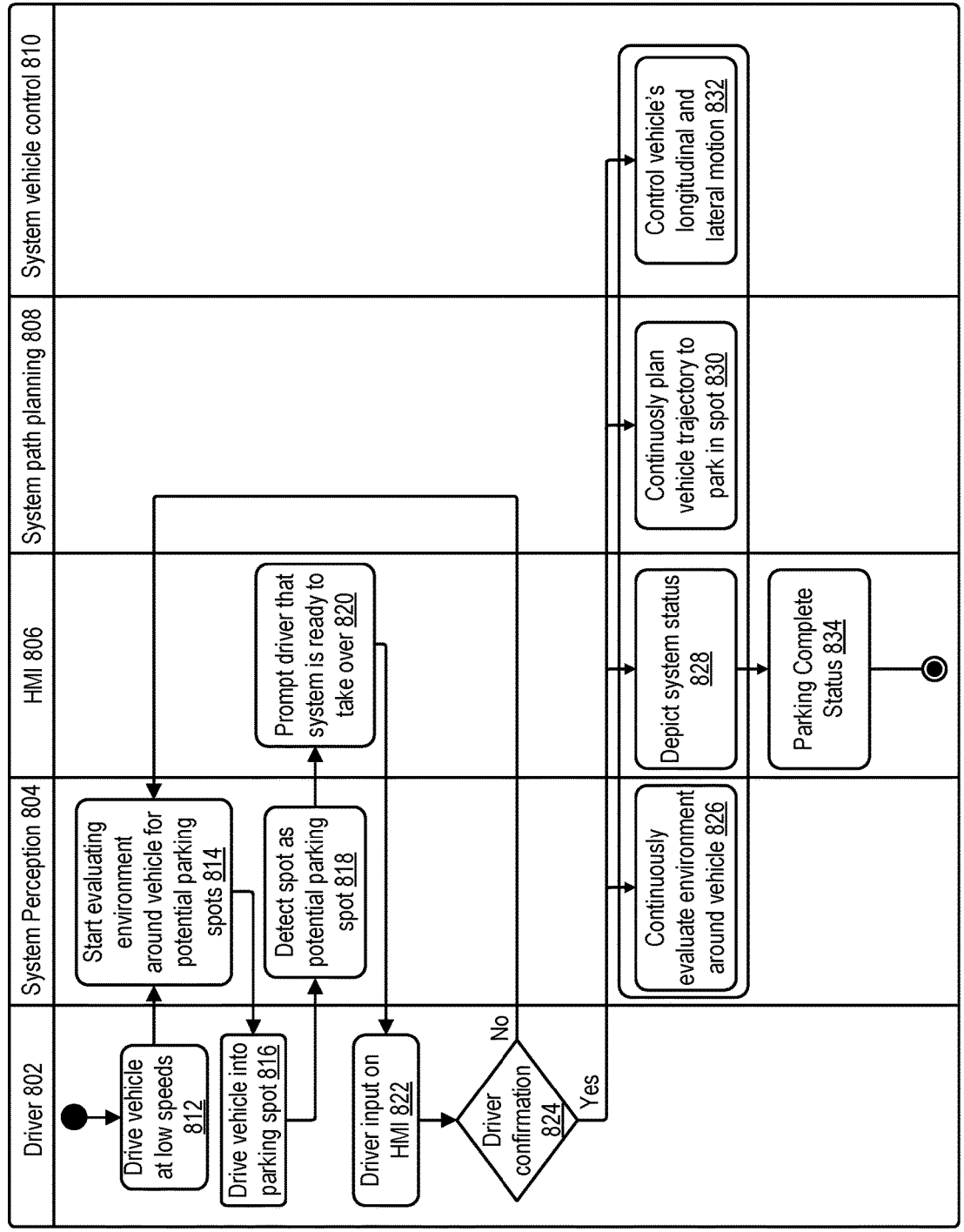
FIG. 8 shows an example of a sequence diagram relating to an AD system being available to complete an ongoing parking maneuver of a vehicle.

FIG. 8 shows an example of a sequence diagram 800 relating to an AD system being available to complete an ongoing parking maneuver of a vehicle. The sequence diagram 800 can be used with one or more other examples described elsewhere herein. More or fewer operations than shown can be performed. Two or more operations can be performed in a different order unless otherwise indicated.

The sequence diagram 800 shows a distribution of operations by, and/or interactions between two or more of, a driver 802, a system perception 804, an HMI 806, a system path planning component 808, or a system vehicle control 810.

At operation 812, the driver 802 can drive the vehicle at relatively low speeds. In some implementations, the AD system can be designed to offer parking assistance only in situations of relatively low speed. For example, this can involve travel at or below the speed limit applicable in a parking lot.

At operation 814, the system perception 804 can evaluate the environment around the vehicle. In some implementations, this can be performed by an AD system continuously monitoring the surroundings of the vehicle. For example, this can allow detection of whether any parking spot is available.

At operation 816, the driver 802 can begin to drive the vehicle into a parking spot.

At operation 818, the system perception 804 can detect the parking spot as being available for the vehicle.

At operation 820, the HMI 806 can generate a prompt to the driver that the AD system is ready to take over the parking maneuver.

At operation 822, the driver 802 can generate an input at the HMI 806.

At operation 824, it can be determined whether the driver accepted (e.g., confirmed) the offered assistance. If the driver did not accept the prompt (i.e., "No" at operation 824) the system perception 804 can continue to evaluate the environment around the vehicle at operation 814.

If the driver did accept the prompt (i.e., "Yes" at operation 824), other operations can be performed. For example, the system perception 804 can continuously evaluate the environment around the vehicle at operation 826. As another example, the HMI 806 can depict a system status at operation 828. As another example, the system path planning component 808 can continuously plan a trajectory for the vehicle at operation 830 (e.g., to park in the given spot). As another example, the system vehicle control 810 can control the vehicle's longitudinal and lateral motion at operation 832. One or more of these operations can be ongoing until the AD system has completed the parking of the vehicle.

At operation 834, the HMI 806 can indicate that the parking is completed.

Figure 9:
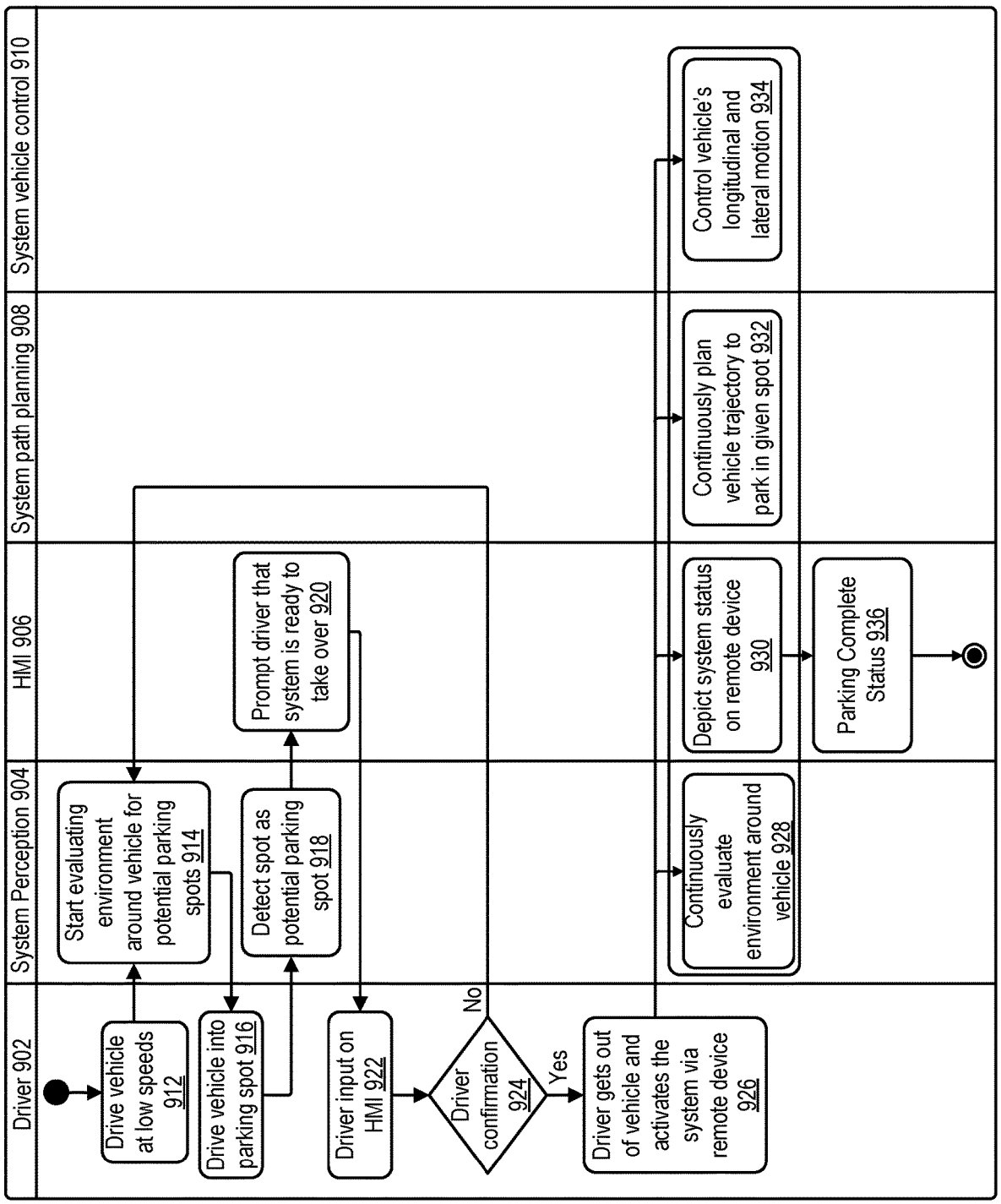
FIG. 9 shows an example of a sequence diagram relating to a driver being outside the vehicle that is being parked by an AD system.

FIG. 9 shows an example of a sequence diagram 900 relating to a driver being outside the vehicle that is being parked by an AD system. The sequence diagram 900 can be used with one or more other examples described elsewhere herein. More or fewer operations than shown can be performed. Two or more operations can be performed in a different order unless otherwise indicated.

The sequence diagram 900 shows a distribution of operations by, and interactions between two or more of, a driver 902, a system perception 904, an HMI 906, a system path planning component 908, or a system vehicle control 910.

At operation 912, the driver 902 can drive the vehicle at relatively low speeds. In some implementations, the AD system can be designed to offer parking assistance only in situations of relatively low speed. For example, this can involve travel at or below the speed limit applicable in a parking lot.

At operation 914, the system perception 904 can evaluate the environment around the vehicle. In some implementations, this can be performed by an AD system continuously monitoring the surroundings of the vehicle. For example, this can allow detection of whether any parking spot is available.

At operation 916, the driver 902 can begin to drive the vehicle into a parking spot.

At operation 918, the system perception 904 can detect the parking spot as being available for the vehicle.

At operation 920, the HMI 906 can generate a prompt to the driver that the AD system is ready to take over the parking maneuver.

At operation 922, the driver 902 can generate an input at the HMI 906.

At operation 924, it can be determined whether the driver accepted (e.g., confirmed) the offered assistance. If the driver did not accept the prompt (i.e., "No" at operation 924) the system perception 904 can continue to evaluate the environment around the vehicle at operation 914.

If the driver did accept the prompt (i.e., "Yes" at operation 924), other operations can be performed. For example, at operation 926 the driver 902 can exit the vehicle. For example, this can allow the driver 902 to activate the assistance by the AD system using a remote device. Moreover, the system perception 904 can continuously evaluate the environment around the vehicle at operation 928. As another example, the HMI 906 can depict a system status at operation 930. As another example, the system path planning component 908 can continuously plan a trajectory for the vehicle at operation 932 (e.g., to park in the given spot). As another example, the system vehicle control 910 can control the vehicle's longitudinal and lateral motion at operation 934. One or more of these operations can be ongoing until the AD system has completed the parking of the vehicle.

At operation 936, the HMI 906 can indicate that the parking is completed.

Figure 10:
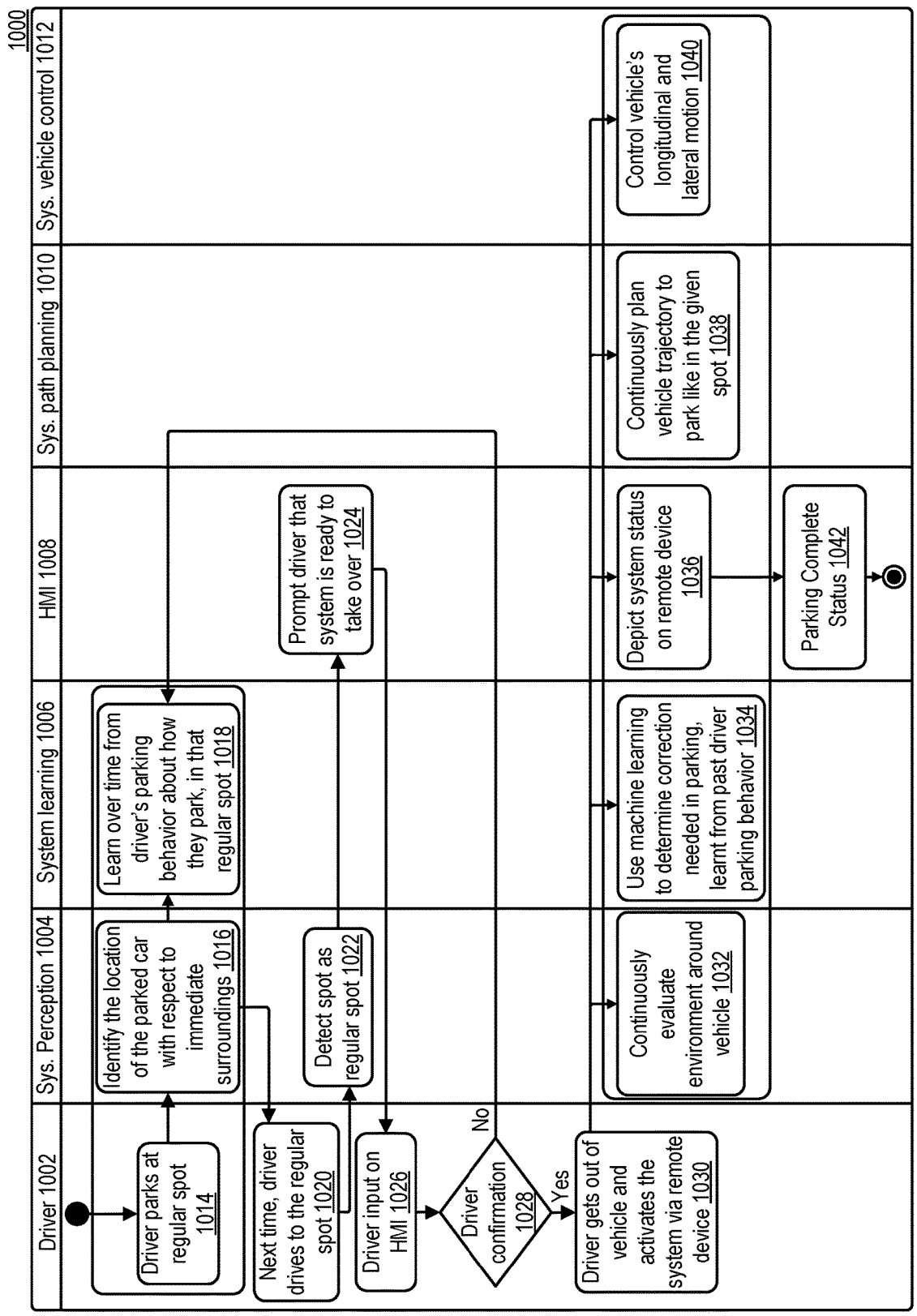
FIG. 10 shows an example of a sequence diagram relating to applying machine learning to an AD system that is available to control parking of a vehicle.

FIG. 10 shows an example of a sequence diagram 1000 relating to applying machine learning to an AD system that is available to control parking of a vehicle. The sequence diagram 1000 can be used with one or more other examples described elsewhere herein. More or fewer operations than shown can be performed. Two or more operations can be performed in a different order unless otherwise indicated.

The sequence diagram 1000 shows a distribution of operations by, and interactions between two or more of, a driver 1002, a system perception 1004, a system learning component 1006, an HMI 1008, a system path planning component 1010, and a system vehicle control 1012.

At operation 1014, the driver 1002 can park the vehicle at a regular parking spot. In some implementations, the AD system can be designed to distinguish between parking maneuvers performed in commonly occurring situations (e.g., at home or at work) and sporadic situations (e.g., at an event). For example, this can allow the AD system to better detect the behavior patterns of the driver 1002.

At operation 1016, the system perception 1004 can identify the location of the vehicle with respect to the immediate surroundings. In some implementations, this can be performed by an AD system continuously monitoring the surroundings of the vehicle.

At operation 1018, the system learning component 1006 can over time (e.g., multiple observed sequences of parking maneuvers) learn from the parking behavior of the driver 1002 how they tend to park in that particular parking spot. As such, machine learning can be performed and associated with the parking spot and/or the driver 1002.

At operation 1020, the driver 1002 drives to the regular spot at another time.

At operation 1022, the system perception 1004 can detect the spot as being the regular spot for which machine learning has been performed.

At operation 1024, the HMI 1008 can generate a prompt to the driver that the AD system is ready to take over the parking maneuver.

At operation 1026, the driver 1002 can generate an input at the HMI 1008.

At operation 1028, it can be determined whether the driver accepted (e.g., confirmed) the offered assistance. If the driver did not accept the prompt (i.e., "No" at operation 1028) the system learning component 1006 can continue to learn from the behavior of the driver 1002.

If the driver did accept the prompt (i.e., "Yes" at operation 1028), other operations can be performed. For example, at operation 1030 the driver 1002 can exit the vehicle. For example, this can allow the driver 1002 to activate the assistance by the AD system using a remote device. Moreover, the system perception 1004 can continuously evaluate the environment around the vehicle at operation 1032. As another example, the system learning component 1006 can use machine learning to determine the needed correction of the parking at operation 1034. In some implementations, the correction is determined based on the past driving behavior of the driver 1002. For example, the machine learning can indicate the orientation in which the vehicle should be placed. As another example, the HMI 1008 can depict a system status at operation 1036. As another example, the system path planning component 1010 can continuously plan a trajectory for the vehicle at operation 1038 (e.g., to park in the given spot according to learned behavior). As another example, the system vehicle control 1012 can control the vehicle's longitudinal and lateral motion at operation 1040. One or more of these operations can be ongoing until the AD system has completed the parking of the vehicle.

At operation 1042, the HMI 1008 can indicate that the parking is completed.

Figure 11:
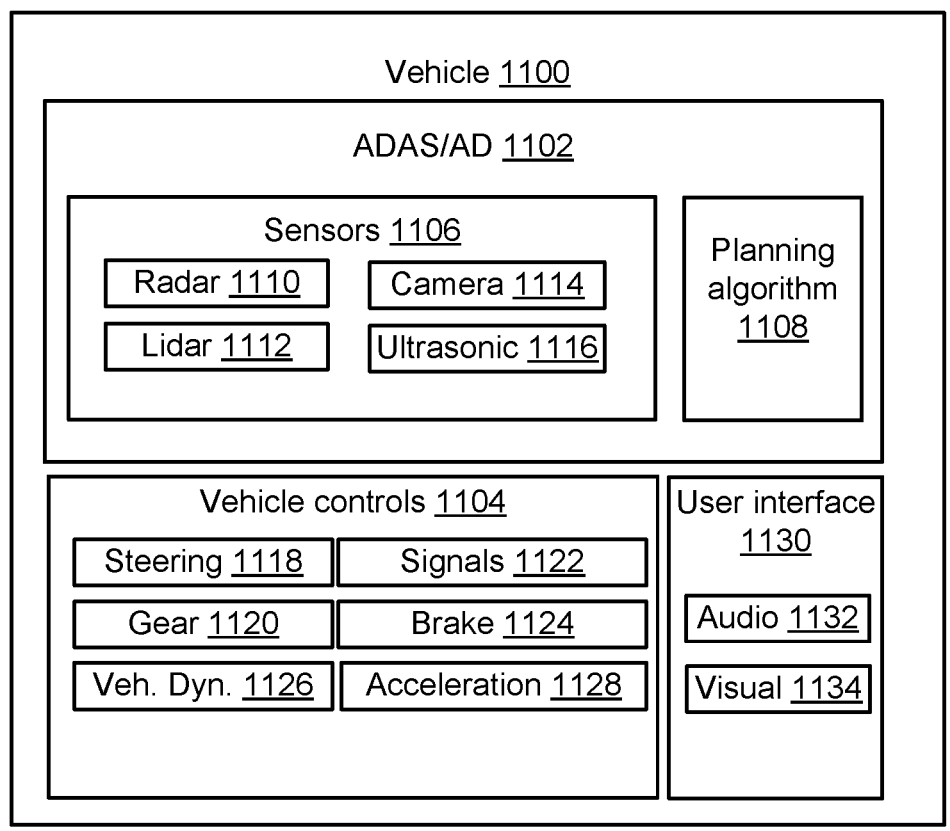
FIG. 11 shows an example of a vehicle.

FIG. 11 shows an example of a vehicle 1100. The vehicle 1100 can be used with one or more other examples described elsewhere herein. The vehicle 1100 includes an ADAS/AD system 1102 and vehicle controls 1104. The ADAS/AD system 1102 can be implemented using some or all components described with reference to FIG. 13 below. The ADAS/AD system 1102 includes sensors 1106 and a planning algorithm 1108. Other aspects that the vehicle 1100 may include, including, but not limited to, other components of the vehicle 1100 where the ADAS/AD system 1102 may be implemented, are omitted here for simplicity.

The sensors 1106 are here described as also including appropriate circuitry and/or executable programming for processing sensor output and performing a detection based on the processing. The sensors 1106 can include a radar 1110. In some implementations, the radar 1110 can include any object detection system that is based at least in part on radio waves. For example, the radar 1110 can be oriented in a forward direction relative to the vehicle and can be used for detecting at least a distance to one or more other objects (e.g., another vehicle). The radar 1110 can detect the surroundings of the vehicle 1100 by sensing the presence of an object in relation to the vehicle 1100.

The sensors 1106 can include a lidar 1112. In some implementations, the lidar 1112 can include any object detection system that is based at least in part on laser light. For example, the lidar 1112 can be oriented in any direction relative to the vehicle and can be used for detecting at least a distance to one or more other objects (e.g., another vehicle). The lidar 1112 can detect the surroundings of the vehicle 1100 by sensing the presence of an object in relation to the vehicle 1100.

The sensors 1106 can include a camera 1114. In some implementations, the camera 1114 can include any image sensor whose signal(s) the vehicle 1100 takes into account. For example, the camera 1114 can be oriented in any direction relative to the vehicle and can be used for detecting vehicles, lanes, lane markings, curbs, and/or road signage. The camera 1114 can detect the surroundings of the vehicle 1100 by visually registering a circumstance in relation to the vehicle 1100.

The sensors 1106 can include an ultrasonic sensor 1116. In some implementations, the ultrasonic sensor 1116 can include any transmitter, receiver, and/or transceiver used in detecting at least the proximity of an object based on ultrasound. For example, the ultrasonic sensor 1116 can be positioned at or near an outer surface of the vehicle. The ultrasonic sensor 1116 can detect the surroundings of the vehicle 1100 by sensing the presence of an object in relation to the vehicle 1100.

Any of the sensors 1106 alone, or two or more of the sensors 1106 collectively, can detect, whether or not the ADAS/AD system 1102 is controlling motion of the vehicle 1100, the surroundings of the vehicle 1100. In some implementations, at least one of the sensors 1106 can generate an output that is taken into account in providing a prompt to a driver, and/or in controlling motion of the vehicle 1100. For example, the output of two or more sensors (e.g., the outputs of the radar 1110, the lidar 1112, and the camera 1114) can be combined. In some implementations, one or more other types of sensors can additionally or instead be included in the sensors 1106.

The planning algorithm 1108 can plan for the ADAS/AD system 1102 to perform one or more actions, or to not perform any action, in response to monitoring of the surroundings of the vehicle 1100 and/or an input by the driver. The output of one or more of the sensors 1106 can be taken into account. In some implementations, the planning algorithm 1108 can perform motion planning and/or plan a trajectory for the vehicle 1100.

The vehicle controls 1104 can include a steering control 1118. In some implementations, the ADAS/AD system 1102 and/or another driver of the vehicle 1100 controls the trajectory of the vehicle 1100 by adjusting a steering angle of at least one wheel by way of manipulating the steering control 1118. The steering control 1118 can be configured for controlling the steering angle though a mechanical connection between the steering control 1118 and the adjustable wheel, or can be part of a steer-by-wire system.

The vehicle controls 1104 can include a gear control 1120. In some implementations, the ADAS/AD system 1102 and/or another driver of the vehicle 1100 uses the gear control 1120 to choose from among multiple operating modes of a vehicle (e.g., a Drive mode, a Neutral mode, or a Park mode). For example, the gear control 1120 can be used to control an automatic transmission in the vehicle 1100.

The vehicle controls 1104 can include signal controls 1122. In some implementations, the signal controls 1122 can control one or more signals that the vehicle 1100 can generate. For example, the signal controls 1122 can control a turn signal and/or a horn of the vehicle 1100.

The vehicle controls 1104 can include brake controls 1124. In some implementations, the brake controls 1124 can control one or more types of braking systems designed to slow down the vehicle, stop the vehicle, and/or maintain the vehicle at a standstill when stopped. For example, the brake controls 1124 can be actuated by the ADAS/AD system 1102. As another example, the brake controls 1124 can be actuated by the driver using a brake pedal.

The vehicle controls 1104 can include a vehicle dynamic system 1126. In some implementations, the vehicle dynamic system 1126 can control one or more functions of the vehicle 1100 in addition to, or in the absence of, or in lieu of, the driver's control. For example, when the vehicle comes to a stop on a hill, the vehicle dynamic system 1126 can hold the vehicle at standstill if the driver does not activate the brake control 1124 (e.g., step on the brake pedal).

The vehicle controls 1104 can include an acceleration control 1128. In some implementations, the acceleration control 1128 can control one or more types of propulsion motor of the vehicle. For example, the acceleration control 1128 can control the electric motor(s) and/or the internal-combustion motor(s) of the vehicle 1100.

The vehicle 1100 can include a user interface 1130. The user interface 1130 can include an audio interface 1132. In some implementations, the audio interface 1132 can include one or more speakers positioned in the passenger compartment. For example, the audio interface 1132 can at least in part operate together with an infotainment system in the vehicle.

In some implementations, the audio interface 1132 can provide speech-recognition functionality. For example, the audio interface 1132 can receive an audio signal from a microphone and can process the audio signal to convert the audio into text. The vehicle 1100 can interpret the text as one or more user commands, and perform one or more actions in response to the command(s). For example, the command can correspond to the instruction "park" (e.g., in FIGS. 1A-1C), "complete my parking" (e.g., in FIGS. 3A-3D), or "fix my parking" (e.g., in FIGS. 5A-5D). The audio interface 1132 can be implemented in the passenger compartment of a vehicle (e.g., any or all vehicles described herein), and/or in a portable electronic device.

The user interface 1130 can include a visual interface 1134. In some implementations, the visual interface 1134 can include at least one display device in the passenger compartment of the vehicle 1100. For example, the visual interface 1134 can include a touchscreen device and/or an instrument cluster display.

In some implementations, the visual interface 1134 can provide gesture-recognition functionality. For example, the visual interface 1134 can receive a video signal from a camera and can process the video signal to interpret a gesture captured by the camera. The vehicle 1100 can apply the interpreted gesture as one or more user commands, and perform one or more actions in response to the command(s). For example, the command can correspond to the instruction "park" (e.g., in FIGS. 1A-1C), "complete my parking" (e.g., in FIGS. 3A-3D), or "fix my parking" (e.g., in FIGS. 5A-5D). The audio interface 1132 can be implemented in the passenger compartment of a vehicle (e.g., any or all vehicles described herein), and/or in a portable electronic device.

Figures 12A, 12B, 12C:
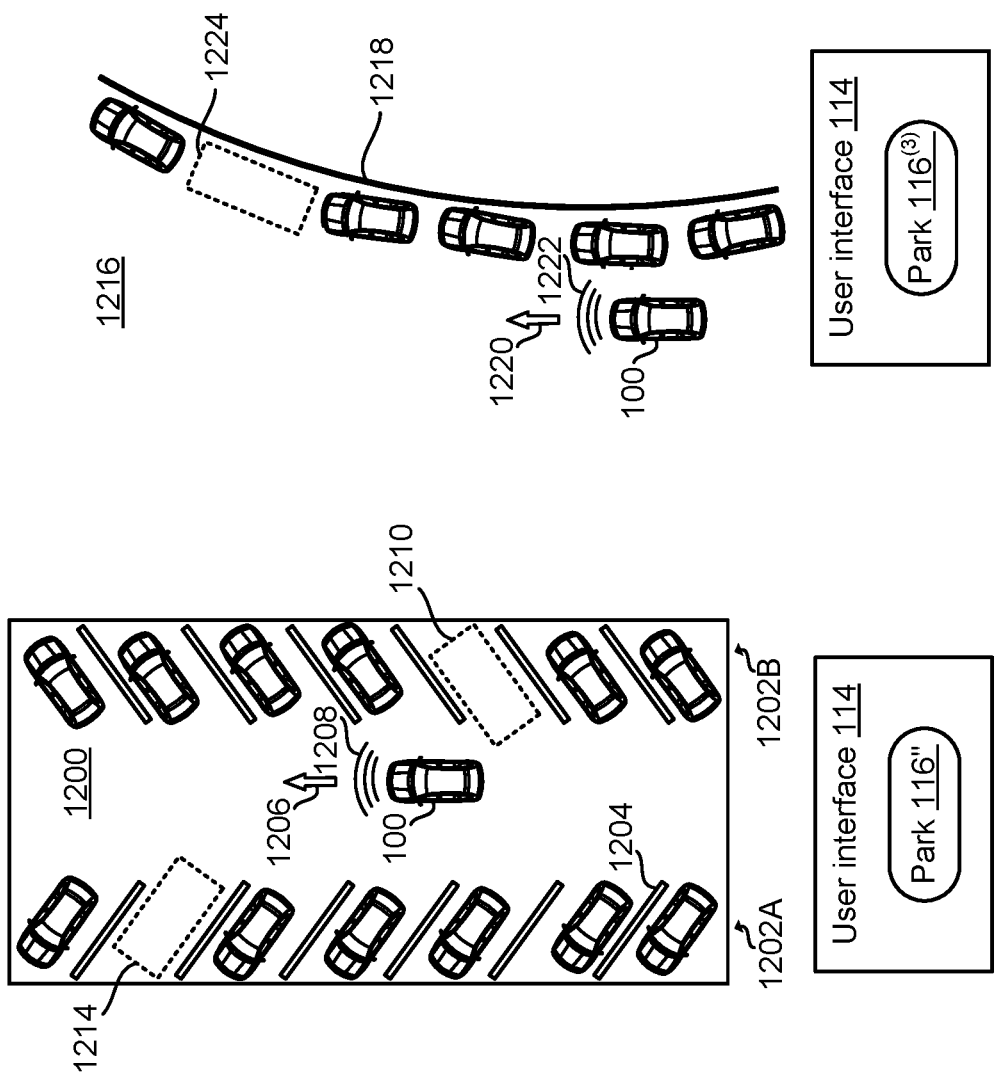
FIGS. 12A-12C show additional examples relating to parking.

FIGS. 12A-12C show additional examples relating to parking. The examples can be used with one or more other examples described elsewhere herein. The example in FIG. 12A will be described with reference to a parking lot 1200, which can have one or more entrances or exits (not shown) for vehicles. Parking spots in the parking lot 1200 can be arranged in one or more rows. A row 1202A includes parking spots defined by dividers 1204 (e.g., painted or structural) so that vehicles are positioned essentially diagonal to the direction of travel along the row 1202A. Similarly, a row 1202B includes parking spots where vehicles are positioned essentially diagonal to the direction of travel along the row 1202B. Other approaches can be used. By being positioned diagonally, the parking spots are neither perpendicular nor parallel to the direction of travel.

The vehicle 100 is traveling within the parking lot 1200, as schematically indicated by an arrow 1206. The vehicle 100 is traveling in a lane that is formed between the rows 1202A-1202B. The vehicle 100 is currently being controlled essentially by the driver. For example, the driver is currently maneuvering the vehicle 100 using a steering wheel, gear selector, accelerator, and brake pedal, in search of an available parking spot in the parking lot 1200.

The AD system of the vehicle 100 is continuously monitoring the surroundings of the vehicle 100 using at least one sensor to detect whether any parking spots are available. The use of the sensor is here schematically illustrated by way of a signal 1208 near the vehicle 100, although the sensor does not necessarily generate any radiation or other emission to probe the surroundings. Here, the AD system of the vehicle 100 may have detected a parking spot 1210 in the row 1202B and may have prompted a passenger of the vehicle 100 using a control 116" in the UI 114. The parking spot 1210 may have been detected before the vehicle 100 has arrived at the parking spot 1210. However, in this example the vehicle 100 has continued to travel within the parking lot 1200 past the location of the parking spot 1210.

The continuous monitoring of the surroundings of the vehicle 100 has here also resulted in detection of a parking spot 1214 located in the row 1202A. The parking spot 1214 is here detected before the vehicle 100 has arrived at the parking spot 1214. For example, it is not necessary for the vehicle 100 to drive up alongside the parking spot 1214, or begin entering the parking spot 1214, for the detection to occur. Rather, the system detects the parking spot 1214 when the sensor(s) generate a signal that reliably indicates that the parking spot 1214 is suitable for the vehicle 100 and is not currently occupied.

As mentioned above, at this point in the example the vehicle 100 may be controlled solely by the driver. Nevertheless, the AD system can plan a trajectory for the vehicle 100 with regard to every parking spot that the AD system detects. This can ensure that the AD system can provide a fluid handover from the driver at any time if the driver so chooses. Here, for example, the AD system plans a trajectory for the vehicle 100 to enter the parking spot 1214 in case the driver wishes to have the vehicle 100 parked there.

The AD system can generate a prompt to the driver regarding one or more detected parking spots. For example, the control 116" can be a GUI button labeled "Park" that offers the driver to have the AD system handle parking of the vehicle 100 in the parking spot 1214. In some implementations, the UI 114 can indicate the parking spot 1214 in which the AD system is currently offering to park the vehicle 100 for the driver. For example, the UI 114 can present a map of at least part of the parking lot 1200 with the parking spot 1214 indicated; or the UI 114 can indicate the parking spot 1214 by way of AR technology applied to an image captured of the surroundings of the vehicle 100. Other approaches can be used.

The driver can accept the prompt by actuating the control 116". The control 116" can be made available to the driver before the vehicle 100 has arrived at the parking spot 1214. For example, it is not necessary for the vehicle 100 to drive up alongside the parking spot 1214, or begin entering the parking spot 1214, for the control 116" to be active. If the driver accepts the prompt by actuating the control 116", the AD system can take over some or all control of the vehicle 100 and maneuver the vehicle 100 into the parking spot 1214. This can involve the AD system receiving the input that the driver generates using the control 116" in response to the prompt, such input being generated before the vehicle enters the parking spot 1214. The AD system can then control the vehicle, in response to the input, to park the vehicle in the parking spot 1214. For example, the AD system can perform this maneuvering using the trajectory for the vehicle 100 that the AD system generates upon detecting the parking spot 1214. This functionality can ensure that convenient parking assistance is provided to the driver, both for identifying available parking spots and, if the driver so wishes at any time during the operation, for taking over to maneuver the vehicle 100 into an available parking spot. The driver can actuate the control 116" using a GUI of the vehicle 100, a GUI of a portable electronic device, by giving an audio command (e.g., using audio interface 1132 in FIG. 11, or a portable electronic device), and/or by making a gesture (e.g., using the visual interface 1134 in FIG. 11, or a portable electronic device), to name just a few examples.

In cases where there is a handover to the AD system, the driver can exit the vehicle 100 before or after control is given to the AD system, or can remain in the vehicle during the maneuver. For example, after the control 116" is made available, the driver can stop the vehicle 100, exit the vehicle into the parking lot 1200, and actuate the control 116" using a remote-control device (e.g., a portable electronic device such as a smartphone having an app that presents the control 116" for actuation). As another example, after stopping the vehicle 100, the driver can open a door of the vehicle 100 and can then actuate the control 116" using a GUI inside the vehicle 100. The AD system can receive the input that the driver generates, and can wait with executing the parking maneuver until it is detected that the door of the vehicle 100 has been closed (at which time the driver may have exited the vehicle 100.) Other approaches can be used.

If the driver of the vehicle 100 does not actuate the control 116", the driver can manually park in either of the parking spots 1210 or 1214, or can forgo parking in the parking lot 1200, to name just two examples. If the driver begins manually parking (e.g., in either of the parking spots 1210 or 1214), one or more other options can be made available to the driver. In some implementations, a "complete my parking" assistance can be offered, for example along the lines of examples described with reference to FIGS. 3A-3D. In some implementations, a "fix my parking" assistance can be offered, for example along the lines of examples described with reference to FIGS. 5A-5D.

The example in FIG. 12B will be described with reference to a road 1216. Parking spots can be arranged along an edge of the road 1216. Here, the road 1216 curves to the right in the present illustration, as indicated by a right edge 1218. The vehicle 100 is traveling along the road 1216, as schematically indicated by an arrow 1220. The vehicle 100 is traveling on the left side of a row of cars parked along the curved shape of the right edge 1218. The vehicle 100 is currently being controlled essentially by the driver. For example, the driver is currently maneuvering the vehicle 100 using a steering wheel, gear selector, accelerator, and brake pedal, in search of an available parking spot along the road 1216.

The AD system of the vehicle 100 is continuously monitoring the surroundings of the vehicle 100 using at least one sensor to detect whether any parking spots are available. The use of the sensor is here schematically illustrated by way of a signal 1222 near the vehicle 100, although the sensor does not necessarily generate any radiation or other emission to probe the surroundings.

As mentioned above, at this point in the example the vehicle 100 may be controlled solely by the driver. Nevertheless, the AD system can plan a trajectory for the vehicle 100 with regard to every parking spot that the AD system detects. This can ensure that the AD system can provide a fluid handover from the driver at any time if the driver so chooses. Here, for example, the AD system plans a trajectory for the vehicle 100 to enter a parking spot 1224 in case the driver wishes to have the vehicle 100 parked there.

Here, the AD system of the vehicle 100 may have detected the parking spot 1224 along the right edge 1218 and may have prompted a passenger of the vehicle 100 using a control $116^{(3)}$ in the UI 114. The parking spot 1224 may have been detected before the vehicle 100 has arrived at the parking spot 1224. The AD system can generate a prompt to the driver regarding one or more detected parking spots. For example, the control $116^{(3)}$ can be a GUI button labeled "Park" that offers the driver to have the AD system handle parking of the vehicle 100 in the parking spot 1224. In some implementations, the UI 114 can indicate the parking spot 1224 in which the AD system is currently offering to park the vehicle 100 for the driver. For example, the UI 114 can present a map of at least part of the road 1216 with the parking spot 1224 indicated; or the UI 114 can indicate the parking spot 1224 by way of AR technology applied to an image captured of the surroundings of the vehicle 100. Other approaches can be used.

The driver can accept the prompt by actuating the control $116^{(3)}$. The control $116^{(3)}$ can be made available to the driver before the vehicle 100 has arrived at the parking spot 1224. For example, it is not necessary for the vehicle 100 to drive up alongside the parking spot 1224, or begin entering the parking spot 1224, for the control $116^{(3)}$ to be active. If the driver accepts the prompt by actuating the control $116^{(3)}$, the AD system can take over some or all control of the vehicle 100 and maneuver the vehicle 100 into the parking spot 1224. This can involve the AD system receiving the input that the driver generates using the control $116^{(3)}$ in response to the prompt, such input being generated before the vehicle enters the parking spot 1224. The AD system can then control the vehicle, in response to the input, to park the vehicle in the parking spot 1224. For example, the AD system can perform this maneuvering using the trajectory for the vehicle 100 that the AD system generates upon detecting the parking spot 1224. This functionality can ensure that convenient parking assistance is provided to the driver, both for identifying available parking spots and, if the driver so wishes at any time during the operation, for taking over to maneuver the vehicle 100 into an available parking spot. The driver can actuate the control 116$^{(3)}$ using a GUI of the vehicle 100, a GUI of a portable electronic device, by giving an audio command (e.g., using audio interface 1132 in FIG. 11, or a portable electronic device), and/or by making a gesture (e.g., using the visual interface 1134 in FIG. 11, or a portable electronic device), to name just a few examples.

In cases where there is a handover to the AD system, the driver can exit the vehicle 100 before or after control is given to the AD system, or can remain in the vehicle during the maneuver. For example, after the control 116$^{(3)}$ is made available, the driver can stop the vehicle 100, exit the vehicle at the road 1216, and actuate the control 116$^{(3)}$ using a remote-control device (e.g., a portable electronic device such as a smartphone having an app that presents the control 116$^{(3)}$ for actuation). As another example, after stopping the vehicle 100, the driver can open a door of the vehicle 100 and can then actuate the control 116$^{(3)}$ using a GUI inside the vehicle 100. The AD system can receive the input that the driver generates, and can wait with executing the parking maneuver until it is detected that the door of the vehicle 100 has been closed (at which time the driver may have exited the vehicle 100.) Other approaches can be used.

If the driver of the vehicle 100 does not actuate the control 116$^{(3)}$, the driver can manually park in the parking spot 1224, or can forgo parking along the road 1216, to name just two examples. If the driver begins manually parking (e.g., in the parking spot 1224), one or more other options can be made available to the driver. In some implementations, a "complete my parking" assistance can be offered, for example along the lines of examples described with reference to FIGS. 3A-3D. In some implementations, a "fix my parking" assistance can be offered, for example along the lines of examples described with reference to FIGS. 5A-5D.

The example in FIG. 12C will be described with reference to a garage 1226. The vehicle 100 is traveling toward the garage 1226, as schematically indicated by an arrow 1228. The vehicle 100 is currently being controlled essentially by the driver. For example, the driver is currently maneuvering the vehicle 100 using a steering wheel, gear selector, accelerator, and brake pedal, while approaching the garage 1226.

The AD system of the vehicle 100 is continuously monitoring the surroundings of the vehicle 100 using at least one sensor to detect whether any parking spots are available. The use of the sensor is here schematically illustrated by way of a signal 1230 near the vehicle 100, although the sensor does not necessarily generate any radiation or other emission to probe the surroundings. As another example, the vehicle 100 can use geolocation technology (e.g., satellite and/or other wireless navigation) to detect that the garage 1226 is nearby, wherein the garage 1226 is known to be a frequent parking spot for the vehicle 100 (e.g., by being the driver's home garage).

As mentioned above, at this point in the example the vehicle 100 may be controlled solely by the driver. Nevertheless, the AD system can plan a trajectory for the vehicle 100 with regard to every parking spot that the AD system detects. This can ensure that the AD system can provide a fluid handover from the driver at any time if the driver so chooses. Here, for example, the AD system plans a trajectory for the vehicle 100 to enter the garage 1226 in case the driver wishes to have the vehicle 100 parked there.

Here, AD system of the vehicle 100 may have detected a parking spot 1232 at the garage 1226 and may have prompted a passenger of the vehicle 100 using a control 116$^{(4)}$ in the UI 114. The parking spot 1232 may have been detected before the vehicle 100 has arrived at the parking spot 1232 (e.g., based on sensor output and/or geolocation). The AD system can generate a prompt to the driver regarding one or more detected parking spots. For example, the control 116$^{(4)}$ can be a GUI button labeled "Park" that offers the driver to have the AD system handle parking of the vehicle 100 in the parking spot 1232. In some implementations, the UI 114 can indicate the parking spot 1232 in which the AD system is currently offering to park the vehicle 100 for the driver. For example, the UI 114 can present a map of at least part of the garage 1226 with the parking spot 1232 indicated; or the UI 114 can indicate the parking spot 1232 by way of AR technology applied to an image captured of the surroundings of the vehicle 100. Other approaches can be used.

The driver can accept the prompt by actuating the control 116$^{(4)}$. The control 116$^{(4)}$ can be made available to the driver before the vehicle 100 has arrived at the parking spot 1232. For example, it is not necessary for the vehicle 100 to drive up alongside the parking spot 1232, or begin entering the parking spot 1232, for the control 116$^{(4)}$ to be active. If the driver accepts the prompt by actuating the control 116$^{(4)}$, the AD system can take over some or all control of the vehicle 100 and maneuver the vehicle 100 into the parking spot 1232. This can involve the AD system receiving the input that the driver generates using the control 116$^{(4)}$ in response to the prompt, such input being generated before the vehicle enters the parking spot 1232. The AD system can then control the vehicle, in response to the input, to park the vehicle in the parking spot 1232. For example, the AD system can perform this maneuvering using the trajectory for the vehicle 100 that the AD system generates upon detecting the parking spot 1232. This functionality can ensure that convenient parking assistance is provided to the driver, both for identifying available parking spots and, if the driver so wishes at any time during the operation, for taking over to maneuver the vehicle 100 into an available parking spot. The driver can actuate the control 116$^{(4)}$ using a GUI of the vehicle 100, a GUI of a portable electronic device, by giving an audio command (e.g., using audio interface 1132 in FIG. 11, or a portable electronic device), and/or by making a gesture (e.g., using the visual interface 1134 in FIG. 11, or a portable electronic device), to name just a few examples.

In cases where there is a handover to the AD system, the driver can exit the vehicle 100 before or after control is given to the AD system, or can remain in the vehicle during the maneuver. For example, after the control 116$^{(4)}$ is made available, the driver can stop the vehicle 100, exit the vehicle at the garage 1226, and actuate the control 116$^{(4)}$ using a remote-control device (e.g., a portable electronic device such as a smartphone having an app that presents the control 116$^{(4)}$ for actuation). As another example, after stopping the vehicle 100, the driver can open a door of the vehicle 100 and can then actuate the control 116$^{(4)}$ using a GUI inside the vehicle 100. The AD system can receive the input that the driver generates, and can wait with executing the parking maneuver until it is detected that the door of the vehicle 100 has been closed (at which time the driver may have exited the vehicle 100.) Other approaches can be used.

If the driver of the vehicle 100 does not actuate the control 116[(4)], the driver can manually park in the parking spot 1232, or can forgo parking in the garage 1226, to name just two examples. If the driver begins manually parking in the parking spot 1232, one or more other options can be made available to the driver. In some implementations, a "complete my parking" assistance can be offered, for example along the lines of examples described with reference to FIGS. 3A-3D. In some implementations, a "fix my parking" assistance can be offered, for example along the lines of examples described with reference to FIGS. 5A-5D.

Figure 13:
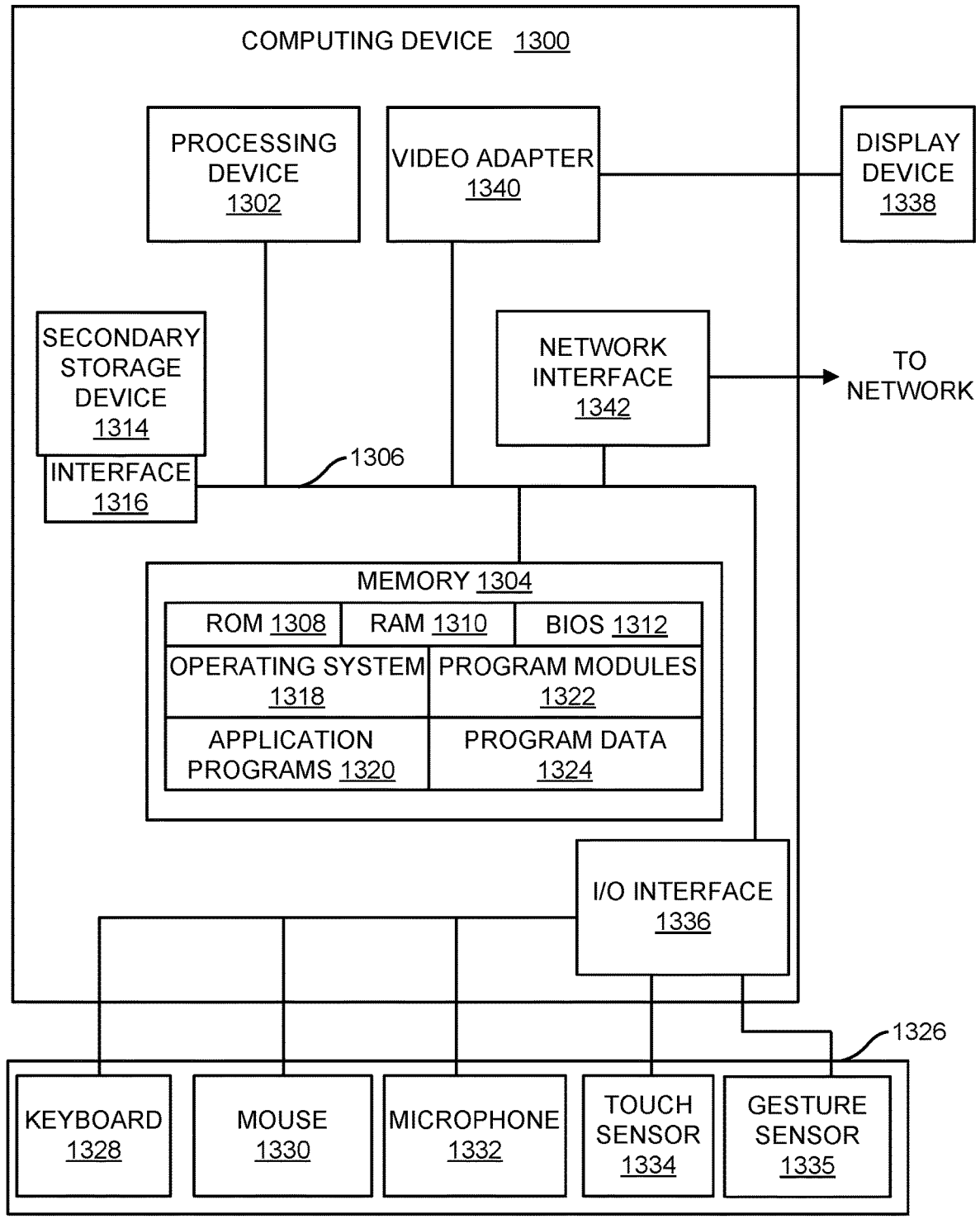
FIG. 13 illustrates an example architecture of a computing device that can be used to implement aspects of the present disclosure.

FIG. 13 illustrates an example architecture of a computing device 1300 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 13 can be used to execute the operating system, application programs, and/or software modules (including the software engines) described herein.

The computing device 1300 includes, in some embodiments, at least one processing device 1302 (e.g., a processor), such as a central processing unit (CPU). A variety of processing devices are available from a variety of manufacturers, for example, Intel or Advanced Micro Devices. In this example, the computing device 1300 also includes a system memory 1304, and a system bus 1306 that couples various system components including the system memory 1304 to the processing device 1302. The system bus 1306 is one of any number of types of bus structures that can be used, including, but not limited to, a memory bus, or memory controller; a peripheral bus; and a local bus using any of a variety of bus architectures.

Examples of computing devices that can be implemented using the computing device 1300 include a desktop computer, a laptop computer, a tablet computer, a mobile computing device (such as a smart phone, a touchpad mobile digital device, or other mobile devices), or other devices configured to process digital instructions.

The system memory 1304 includes read only memory 1308 and random access memory 1310. A basic input/output system 1312 containing the basic routines that act to transfer information within computing device 1300, such as during start up, can be stored in the read only memory 1308.

The computing device 1300 also includes a secondary storage device 1314 in some embodiments, such as a hard disk drive, for storing digital data. The secondary storage device 1314 is connected to the system bus 1306 by a secondary storage interface 1316. The secondary storage device 1314 and its associated computer readable media provide nonvolatile and non-transitory storage of computer readable instructions (including application programs and program modules), data structures, and other data for the computing device 1300.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 1314 and/or system memory 1304, including an operating system 1318, one or more application programs 1320, other program modules 1322 (such as the software engines described herein), and program data 1324. The computing device 1300 can utilize any suitable operating system, such as MICROSOFT WINDOWS™, GOOGLE CHROME™ OS, APPLE OS, UNIX, or LINUX and variants and any other operating system suitable for a computing device. Other examples can include Microsoft, Google, or Apple operating systems, or any other suitable operating system used in tablet computing devices.

In some embodiments, a user provides inputs to the computing device 1300 through one or more input devices 1326. Examples of input devices 1326 include a keyboard 1328, mouse 1330, microphone 1332 (e.g., for voice and/or other audio input), touch sensor 1334 (such as a touchpad or touch sensitive display), and gesture sensor 1335 (e.g., for gestural input). In some implementations, the input device(s) 1326 provide detection based on presence, proximity, and/or motion. In some implementations, a user may walk into their home, and this may trigger an input into a processing device. For example, the input device(s) 1326 may then facilitate an automated experience for the user. Other embodiments include other input devices 1326. The input devices can be connected to the processing device 1302 through an input/output interface 1336 that is coupled to the system bus 1306. These input devices 1326 can be connected by any number of input/output interfaces, such as a parallel port, serial port, game port, or a universal serial bus. Wireless communication between input devices 1326 and the input/output interface 1336 is possible as well, and includes infrared, BLUETOOTH® wireless technology, 802.11a/b/g/n, cellular, ultra-wideband (UWB), ZIGBEE, or other radio frequency communication systems in some possible embodiments, to name just a few examples.

In this example embodiment, a display device 1338, such as a monitor, liquid crystal display device, light-emitting diode display device, projector, or touch sensitive display device, is also connected to the system bus 1306 via an interface, such as a video adapter 1340. In addition to the display device 1338, the computing device 1300 can include various other peripheral devices (not shown), such as speakers or a printer.

The computing device 1300 can be connected to one or more networks through a network interface 1342. The network interface 1342 can provide for wired and/or wireless communication. In some implementations, the network interface 1342 can include one or more antennas for transmitting and/or receiving wireless signals. When used in a local area networking environment or a wide area networking environment (such as the Internet), the network interface 1342 can include an Ethernet interface. Other possible embodiments use other communication devices. For example, some embodiments of the computing device 1300 include a modem for communicating across the network.

The computing device 1300 can include at least some form of computer readable media. Computer readable media includes any available media that can be accessed by the computing device 1300. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1300.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 13 is also an example of programmable electronics, which may include one or more such computing devices, and when multiple computing devices are included, such computing devices can be coupled together with a suitable data communication network so as to collectively perform the various functions, methods, or operations disclosed herein.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method comprising:
continuously monitoring, by an assisted-driving (AD) system using a sensor, surroundings of a vehicle being controlled by a driver;
detecting, by the AD system using the sensor, a parking spot that is available;
planning, by the AD system and in response to detecting the parking spot, a trajectory for the vehicle to park in the parking spot;
generating a prompt to the driver, by the AD system and in response to detecting the parking spot, to have the AD system handle parking of the vehicle in the parking spot using the planned trajectory, the prompt performed before the vehicle reaches the parking spot;
wherein the driver begins entering the vehicle into the parking spot without accepting the prompt by the AD system, the method further comprising:
continuing to generate the prompt to the driver during at least part of a vehicle maneuver where the driver is parking the vehicle in the parking spot.

2. The computer-implemented method of claim 1, wherein the parking spot is substantially parallel to a travel path of the vehicle when the AD system detects the parking spot.

3. The computer-implemented method of claim 1, wherein the parking spot is substantially perpendicular to a travel path of the vehicle when the AD system detects the parking spot.

4. The computer-implemented method of claim 1, wherein the parking spot is substantially diagonal to a travel path of the vehicle when the AD system detects the parking spot.

5. The computer-implemented method of claim 1, further comprising:
receiving, by the AD system, an input that the driver generates in response to the prompt, the input generated before the vehicle enters the parking spot; and
controlling the vehicle, by the AD system and in response to the input, to park the vehicle in the parking spot.

6. The computer-implemented method of claim 5, wherein the driver exits the vehicle before the AD system parks the vehicle in the parking spot.

7. The computer-implemented method of claim 1, wherein continuing to generate the prompt indicates that the AD system is available to complete the parking of the vehicle in the parking spot at any time.

8. The computer-implemented method of claim 1, further comprising:
receiving, by the AD system, an input that the driver generates in response to the AD system continuing to generate the prompt, the input generated before the vehicle is stationary in the parking spot; and
controlling the vehicle, by the AD system and in response to the input, to park the vehicle in the parking spot.

9. The computer-implemented method of claim 1, wherein the driver finishes parking the vehicle in the parking spot without accepting the prompt by the AD system, the vehicle having a first orientation within the parking spot, the method further comprising:

performing motion planning, by the AD system, to move the vehicle into a second orientation within the parking spot;

receiving, by the AD system, an input generated by a user to correct the first orientation; and in response to the input, controlling the vehicle, by the AD system and according to the motion planning, to assume the second orientation within the parking spot.

10. A computer-implemented method comprising:

determining, by an assisted-driving (AD) system using a sensor, that a vehicle fully manually controlled by a driver begins entering a parking spot;

generating a prompt to the driver, by the AD system and in response to determining that the vehicle begins entering the parking spot, to have the AD system handle parking of the vehicle in the parking spot, wherein generating the prompt indicates that the AD system is available to complete the parking of the vehicle in the parking spot at any time;

receiving, by the AD system, an input generated by the driver in response to the prompt; and controlling the vehicle, by the AD system and in response to the input, to finish parking the vehicle in the parking spot.

11. The computer-implemented method of claim 10, wherein the prompt includes at least one of a visual message or an audio message.

12. The computer-implemented method of claim 10, wherein the input is generated using a touchscreen of the vehicle.

13. The computer-implemented method of claim 10, wherein the driver exits the vehicle before the AD system controls the vehicle to finish parking the vehicle in the parking spot.

14. The computer-implemented method of claim 10, wherein controlling the vehicle to finish parking the vehicle in the parking spot comprises parking the vehicle in an orientation within the parking spot, the orientation being obtained using a machine-learning component that has analyzed previous instances where the vehicle was parked.

15. A computer-implemented method comprising:

determining, by an assisted-driving (AD) system using a sensor, that a vehicle fully manually controlled by a driver begins entering a parking spot;

generating a first prompt to the driver, by the AD system and in response to determining that the vehicle begins entering the parking spot, to have the AD system handle parking of the vehicle in the parking spot, wherein generating the prompt indicates that the AD system is available to complete the parking of the vehicle in the parking spot at any time, wherein the driver does not accept the first prompt before parking the vehicle;

determining, by the AD system using the sensor and after generating the first prompt, that the vehicle is stationary in a first orientation of the vehicle with regard to the parking spot, wherein the vehicle was brought into the first orientation within the parking spot under control of the driver;

performing motion planning, by the AD system, to move the vehicle into a second orientation of the vehicle with regard to the parking spot;

generating a second prompt to a user, by the AD system and in response to determining that the vehicle is stationary, to have the AD system correct the first orientation of the vehicle;

receiving, by the AD system, an input generated by the user in response to the second prompt; and in response to the input, controlling the vehicle, by the AD system and according to the motion planning, to assume the second orientation of the vehicle with regard to the parking spot.

16. The computer-implemented method of claim 15, wherein the user is located outside the vehicle while generating the input.

17. The computer-implemented method of claim 15, wherein the user is located outside the vehicle while the AD system controls the vehicle to assume the second orientation within the parking spot.

18. The computer-implemented method of claim 15, wherein the AD system obtains the second orientation using a machine-learning component that has analyzed previous instances where the vehicle was parked.

19. The computer-implemented method of claim 15, further comprising providing a seamless transition between (i) initially offering, by the first prompt, to have the AD system handle the parking of the vehicle in the parking spot, and (ii) thereafter offering, by the second prompt, to have the AD system correct the first orientation of the vehicle.

* * * * *